US010152739B2

(12) United States Patent
Mansfield et al.

(10) Patent No.: US 10,152,739 B2
(45) Date of Patent: Dec. 11, 2018

(54) SMARTPHONE SOFTWARE APPLICATION FOR IDENTIFICATION OF SOUND- OR LIGHT-EMITTING VEHICLE ACCESSORY PRODUCT MODELS

(71) Applicant: Electronic Controls Company, Boise, ID (US)

(72) Inventors: Todd Mansfield, Boise, ID (US); Norm Nguyen, Boise, ID (US); William M. Cresse, Boise, ID (US)

(73) Assignee: Electronic Controls Company, Boise, ID (US)

( * ) Notice: Subject to any disclaimer, the term of this patent is extended or adjusted under 35 U.S.C. 154(b) by 607 days.

(21) Appl. No.: 14/775,214

(22) PCT Filed: Mar. 13, 2014

(86) PCT No.: PCT/US2014/026651
§ 371 (c)(1),
(2) Date: Sep. 11, 2015

(87) PCT Pub. No.: WO2014/160447
PCT Pub. Date: Oct. 2, 2014

(65) Prior Publication Data
US 2016/0034998 A1 Feb. 4, 2016

Related U.S. Application Data

(60) Provisional application No. 61/780,392, filed on Mar. 13, 2013.

(51) Int. Cl.
*G06Q 30/00* (2012.01)
*G06Q 30/06* (2012.01)
(Continued)

(52) U.S. Cl.
CPC ..... *G06Q 30/0627* (2013.01); *G06Q 30/0603* (2013.01); *G06Q 30/0621* (2013.01);
(Continued)

(58) Field of Classification Search
None
See application file for complete search history.

(56) References Cited

U.S. PATENT DOCUMENTS 3,579,233 A * 5/1971 Raschke ............... G08B 3/10
340/384.72
2002/0198789 A1* 12/2002 Waldman ............... G06Q 30/06
705/27.1

FOREIGN PATENT DOCUMENTS

EP 2410482 A1 1/2012

OTHER PUBLICATIONS

Dean, "iPhone App—Decibel Ultra", Ramblings of a Techie, archived at https://web.archive.org/web/20110517013831/http://theatretechgeek.wordpress.com/2011/03/10/iphone-app-decibel-ultra/, archived May 17, 2011, posted date Mar. 10, 2011.
(Continued)

*Primary Examiner* — William J Allen
*Assistant Examiner* — Maria S. P. Heath
(74) *Attorney, Agent, or Firm* — Stoel Rives LLP; Robert R. Teel

(57) ABSTRACT

A mobile device software app facilitates a user's identification of a product suitable for various vehicle types and operating environments. The app configures a sensor in the device to sample ambient sound or light in the vicinity of the vehicle, calculates an intensity level value for the sample, compares the value to a list of specification intensity values corresponding to vehicle accessory products, and generates a list of products having intensity values greater than that of the sampled sound or light. The app optionally provides for user selection of a product and for viewing product literature. Users can also access detailed technical installation information, listen to sound samples, and locate product vendors.

24 Claims, 24 Drawing Sheets

(51) Int. Cl.
*G07C 5/00* (2006.01)
*G07C 5/08* (2006.01)
(52) U.S. Cl.
CPC ..... *G06Q 30/0631* (2013.01); *G06Q 30/0643* (2013.01); *G07C 5/008* (2013.01); *G07C 5/0808* (2013.01); *G07C 5/0833* (2013.01)

(56) References Cited

OTHER PUBLICATIONS

HELLA KGAA HUECK & Co, "Hella Horns on the App Store", https://itunes.apple.com/en/app/hella-horns/id458014355?mt=8, retrieved Oct. 9, 2015.
HELLA KGAA HUECK & Co, "Natchfahrt on the App Store", https://itunes.apple.com/en/app/nachtfahrt/id586594615?mt=8, retrieved Oct. 9, 2015.
HELLA KGAA HUECK & Co., "Addlight on the App Store", https://itunes.apple.com/us/app/addlight/id544244877?mt=8, retrieved Oct. 9, 2015.
HELLA KGAA HUECK & Co., "HELLA—Worklights, Auxiliary Headlights, Beacons, Optical Warning Systems", http://www.hella.com/MicroSite/eliver_start/index_en.html, retrieved Oct. 9, 2015.
HELLA KGAA HUECK & Co., "Worklights on the App Store", https://itunes.apple.com/en/app/worklights/id560528427?mt=8, retrieved Oct. 9, 2015.

\* cited by examiner

SMARTPHONE SOFTWARE APPLICATION FOR IDENTIFICATION OF SOUND- OR LIGHT-EMITTING VEHICLE ACCESSORY PRODUCT MODELS

RELATED APPLICATIONS

This application is the National Stage of International Application No. PCT/US14/26651, filed Mar. 13, 2014, which claims priority benefit of U.S. Provisional Patent Application No. 61/780,392, filed Mar. 13, 2013.

COPYRIGHT NOTICE

© 2014 Electronic Controls Company, A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

This disclosure relates generally to internet-enabled mobile digital device software applications and, more particularly, to use of such applications for purposes of product selection.

BACKGROUND INFORMATION

Internet-enabled mobile devices are portable computing devices having compact (one-piece) form factors, a wireless data transceiver, and typically a touchscreen human interface. Internet-enabled mobile devices are referred to herein as mobile devices.

In terms of hardware specifications, many mobile devices weigh less than two pounds, have a battery that maintains its charge for a period (depending on usage) ranging from approximately three to 12 hours, and employ solid-state memory due to its resistance to damage during transport and use of the device. Some mobile devices also rely on cloud storage, in conjunction with local storage, to increase effective storage capacity. For example, large media files such as videos, photos, eBooks, and music stored in the cloud can be streamed seamlessly into the mobile device via a wireless internet connection. Thus, a local hard drive may be used primarily for storing data associated with other downloadable media, such as software applications (apps) including games or education tools, and other system software utilities. Additionally, mobile devices typically include a Wi-Fi transceiver, mobile broadband hardware (2G, 3G, 4G, or LTE), Bluetooth, or other electronic circuitry used to exchange data wirelessly (using radio waves) over high-speed internet connections. Many mobile devices also include high-resolution color touchscreen displays with anti-glare technology, cellular mobile telephony hardware and software, user input tactile button or switch controls, a speaker or headset jack, and various sensors discussed in later portions of this document. For example, an accelerometer is used to detect the physical movements of the device or control the orientation of the touchscreen. This provides flexibility of use because users of mobile devices do not necessarily maintain the device in a stationary position. Additionally, an accelerometer or other sensors can detect movement of the device and generate positional information that can be used for various software interface control schemes.

Mobile devices have been marketed and specialized for various purposes. Depending on the particular hardware configuration, mobile devices are used for the following purposes: receiving published magazines, newspapers, or subscription-based interactive or conventional media content; viewing video that is either streamed or locally stored; capturing, sharing, or editing digital photography and video media; email and social media communication, which may include operating system (OS) integration configured to receive and aggregate various social media content feeds into a single news feed; fully functional web browsing via software capable of rendering and displaying mobile-optimized websites as well as web pages designed specifically for conventional desktop personal computers; SMS messaging; mobile telephone calling; and live video conferencing. Some of these and other functions are provided by mobile devices including smartphones, tablet computers (tablets), eBook readers, and other handheld digital media players.

The first smartphones combined the functions of a personal digital assistant (PDA) and a mobile telephone. To provide users with a single multi-use device, later smartphones added the functionality of portable media players, compact digital cameras, pocket video recorders, and GPS navigation units. An iPhone®, available from Apple Inc. of Cupertino, Calif., is an example of a modern smartphone. Modern smartphones include OSs such as Android, iOS, Symbian, BlackBerry OS, Bada, and various other OSs. These OSs can be installed on many different models of mobile devices, and mobile devices frequently receive multiple OS software version updates during their useful lifetimes. In recent years, the development of third-party apps, app marketplaces, and mobile commerce in general has facilitated rapid consumer adoption of smartphones.

Another type of mobile device is a tablet, such as a Kindle Fire® available from Amazon.com of Seattle, Wash. A tablet is a one-piece mobile device, primarily operated by its touchscreen. Touchscreens are available in a variety of sizes, and tablet touchscreens are typically larger than those of smartphones or PDAs. Like a smartphone, however, the touchscreen of a tablet also provides an onscreen virtual keyboard and other virtual controls for receiving user input. For example, an operator or user of a tablet taps or slides a finger, which functions as a stylus that is functionally analogous to a cursor or mouse pointer used with conventional desktop or laptop computers. Additionally, tablets or smartphones also may be connected to a keyboard or other peripheral devices via a wireless link (e.g., Bluetooth) or a USB port. Some recent tablets offer an optional docking station that supports a full-size QWERTY keyboard and USB ports, thereby providing both portability and the convenience of tactile keys.

SUMMARY OF THE DISCLOSURE

Systems and methods implement techniques for using a mobile device's internal or external sensors (e.g., a microphone, camera image sensor, accelerometer, gyroscope, GPS, proximity sensor, RFID, touchscreen gesture sensor, or other sensors) to acquire data from an operating environment, compare the data to a product specification (i.e., objective data), and determine a product that has a specification suited for the operating environment. In one embodiment, an app receives microphone sensor data and thereby augments a user's ability make an objective and satisfactory product selection decision by determining a suitable vehicle backup alarm product based on the alarm's specifications and the microphone sensor data obtained from the alarm's anticipated operating environment. In some embodiments, an app accesses a database of product specifications and other objective data obtained from accepted procedures, standards, or regulations and compares sensor data to the objective data to facilitate regulatory compliance and safety certification processes.

Additional aspects and advantages will be apparent from the following detailed description of preferred embodiments, which proceeds with reference to the accompanying drawings.

DETAILED DESCRIPTION OF EMBODIMENTS

Mobile devices typically have a variety of sensors, such as GPS satellite navigation, gyroscopic or orientation sensors, accelerometers, one or more camera image sensors for video conferencing or capturing digital media including photographs and video, ambient light and proximity sensors, and microphones. Such sensors may be used for obtaining information from a variety of operating environments.

Figure 1:
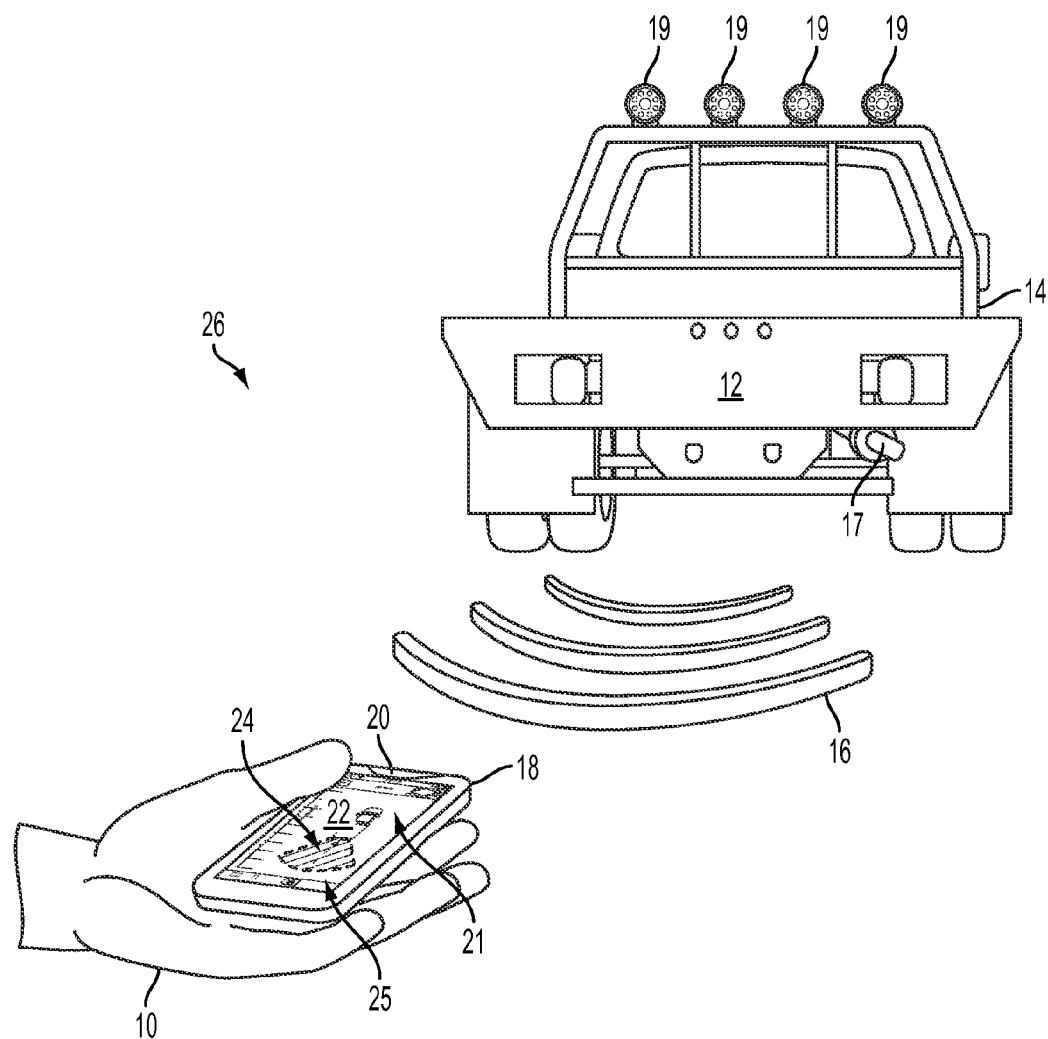
FIG. 1 is a pictorial view of a smartphone having internal sensors (microphone and image sensor) and a touchscreen displaying a software application user interface for receiving user input by finger touches to control the interface and select a product based on sound or light detected via the sensors, according to one embodiment.

FIG. 1 shows a user 10 holding a smartphone 18. The smartphone 18 is positioned behind a tail end 12 of a work truck 14 that is producing sound and light 16 from, respectively, an exhaust 17 and floodlights 19. The smartphone 18 includes sensors such as an internal microphone 20, an image sensor 21, and a touchscreen 22. Touchscreen 22 is presenting a software application graphical user interface display 24 (or simply interface 24) of a vehicle accessory product information software application 25 (or simply app 25). Interface 24 receives user input effected by user 10 manipulating touchscreen 22 to cause app 25 to sample sound intensity level (A-weighted decibels in dB(A), or simply "dB") using microphone 20 in a first embodiment, or light intensity level (lux) using image sensor 21 in a second embodiment. Accordingly, app 25 described in the following paragraphs has multiple measurement-based product model search utilities that process sensor data obtained at a job site (or other equipment operating environment) and, based on a sampled intensity level, app 25 determines and displays sound- or light-emitting vehicle accessory product models having specification data or other predetermined objective criteria meeting or exceeding the sampled intensity level, and thereby being suitable for use in an operating environment 26.

Figure 17:
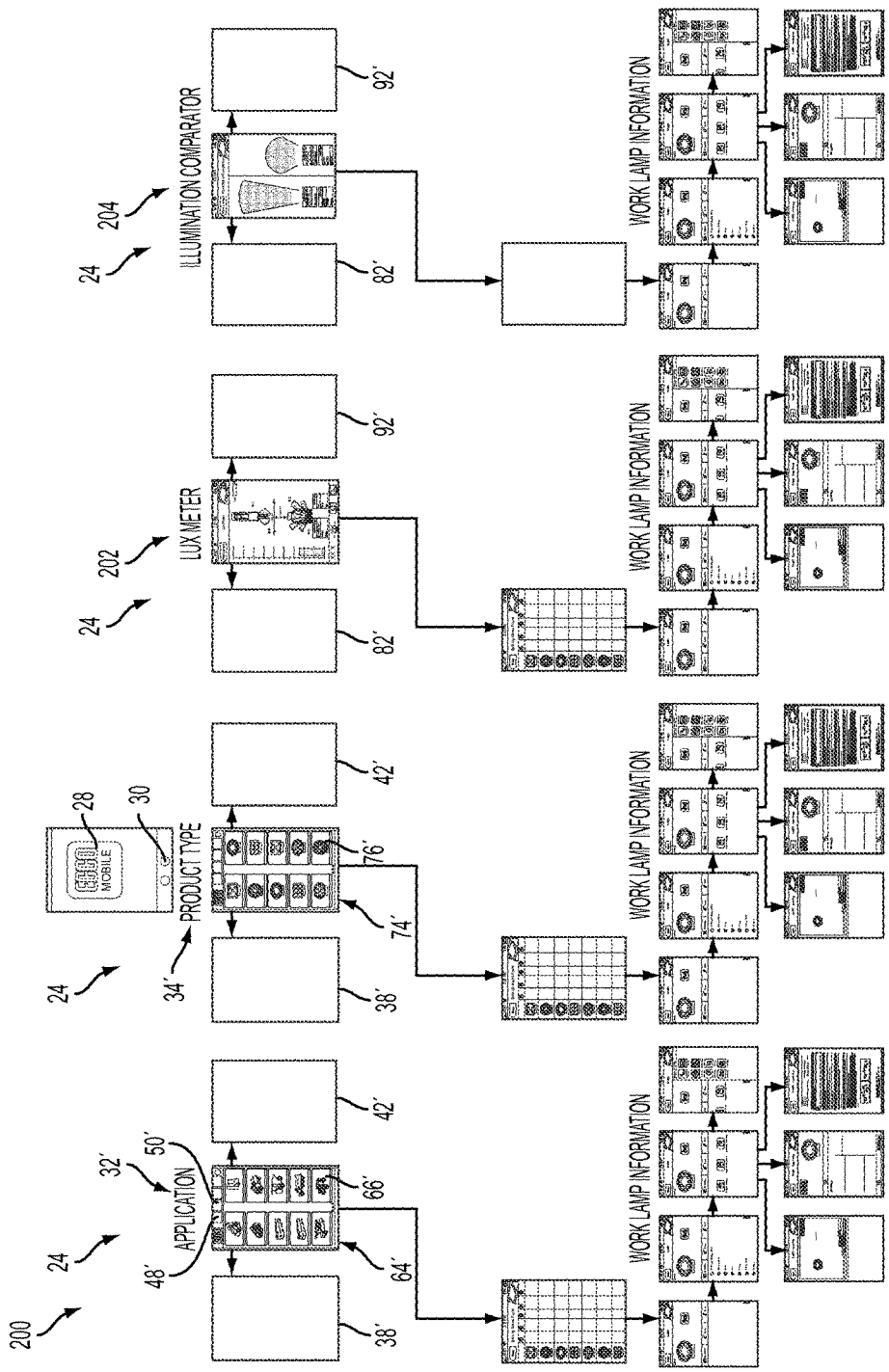
FIG. 17 is a flow diagram of reduced-size screen captures of the interface of FIG. 1, showing hierarchical menu sequences for four work lamp product-catalog search utilities including application-specific, product-type, operating environment lux level measurement, and isolux plot illumination comparator product model search utilities.
Figure 18:
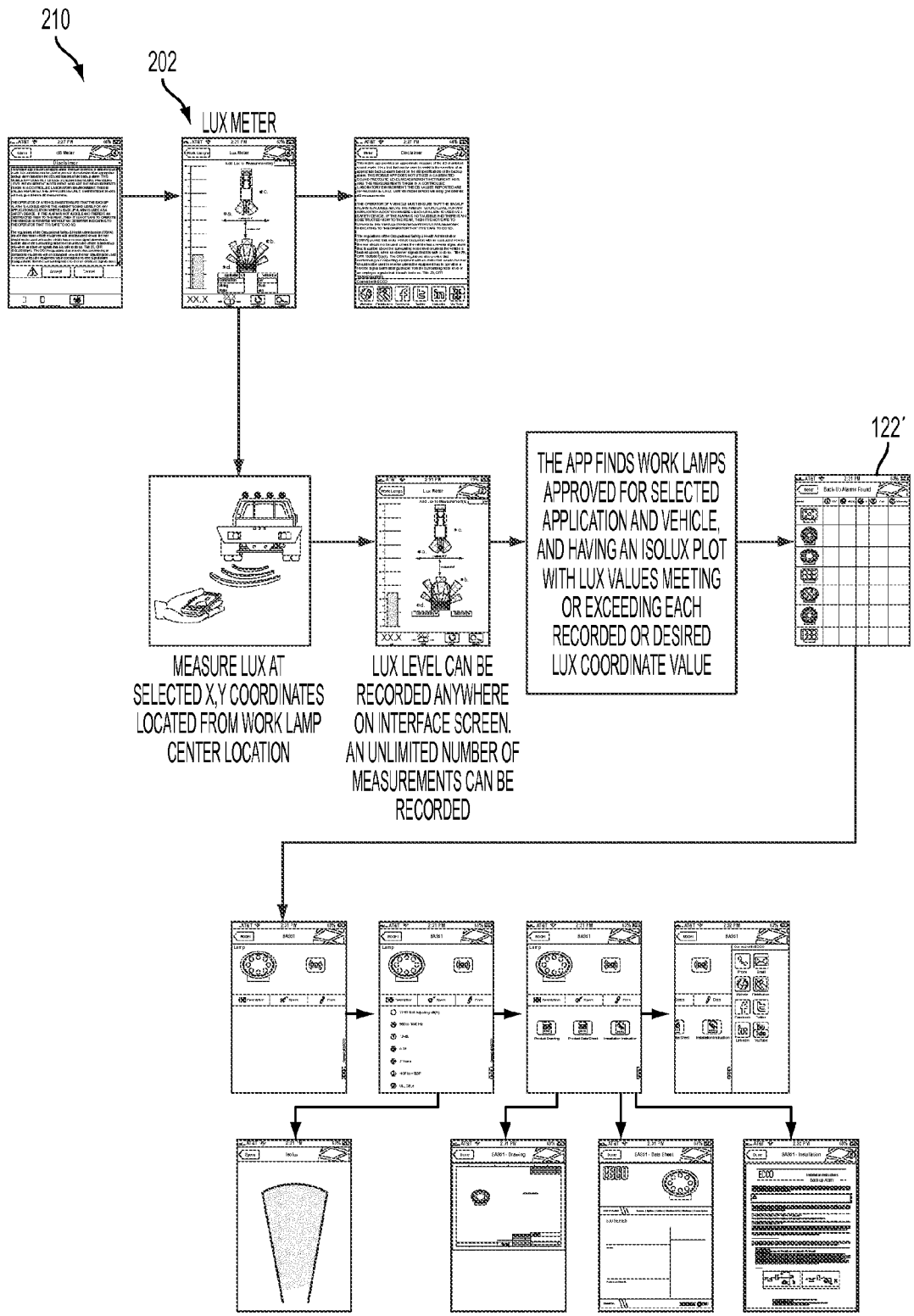
FIG. 18 is an annotated flow diagram showing use of the lux level measurement product model search utility of FIG. 17.
Figure 19:
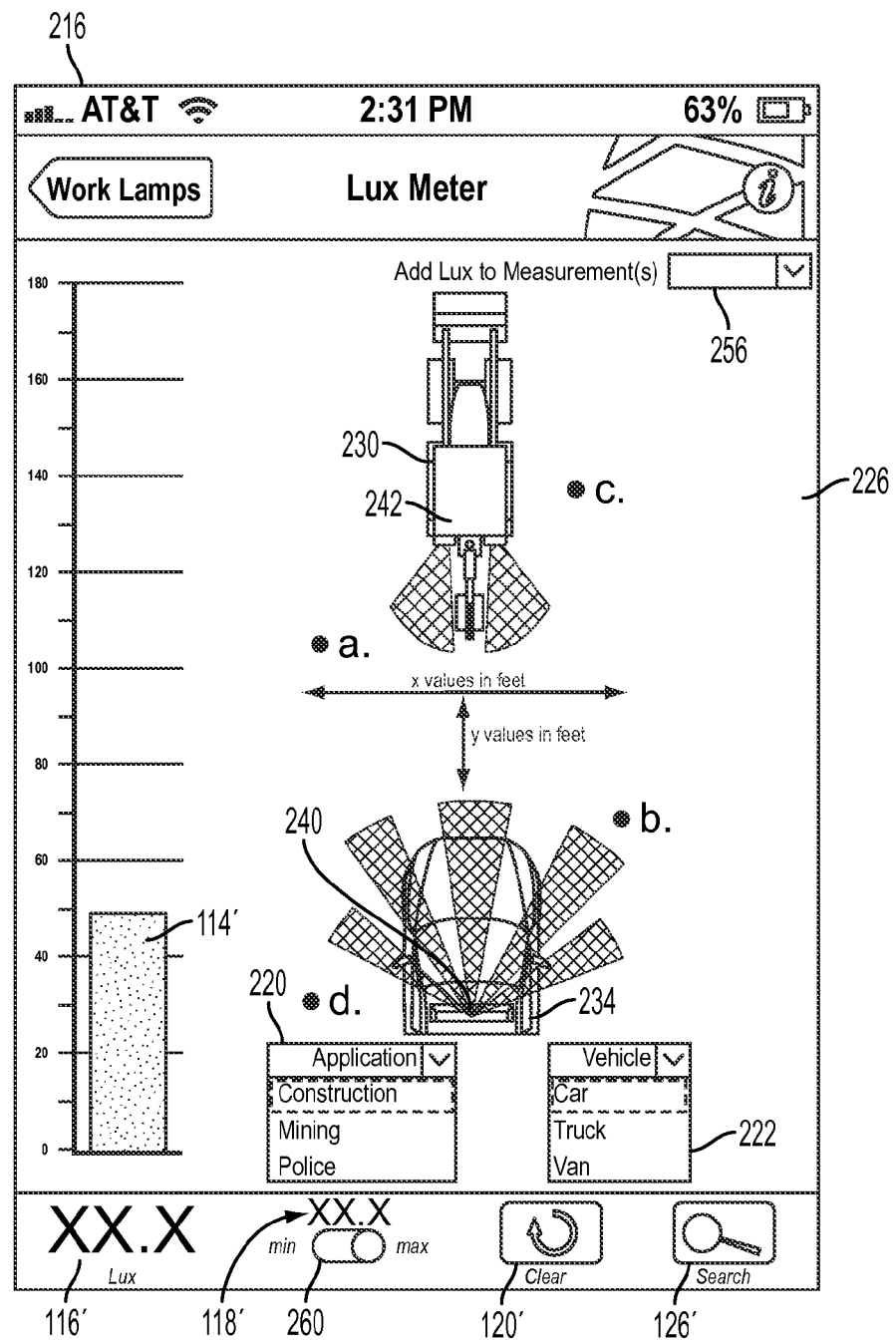
FIG. 19 is an enlarged screen capture of the lux level measurement product model search utility of FIGS. 17 and 18.
Figure 20:
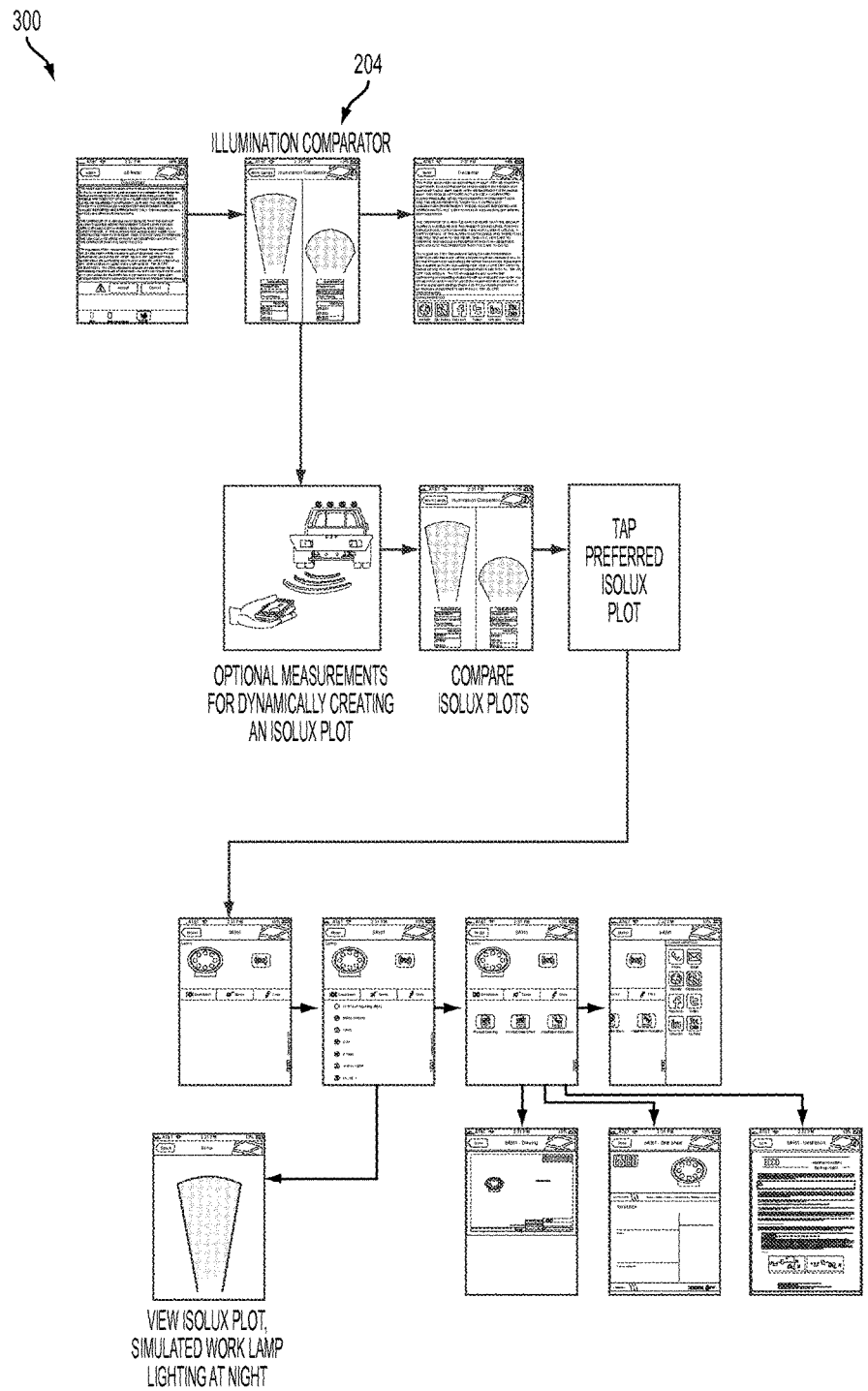
FIG. 20 is an annotated flow diagram showing use of the isolux plot illumination comparator product model search utility of FIG. 17.
Figure 21:
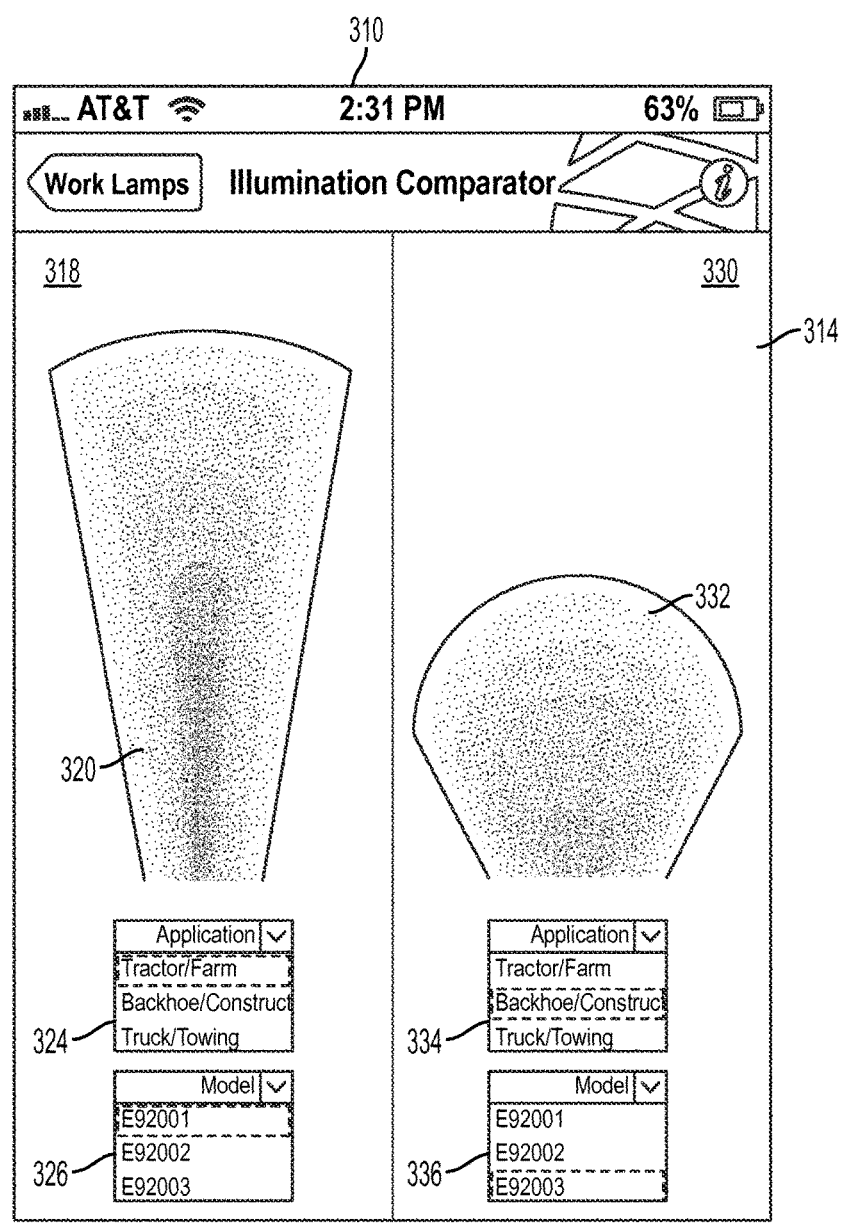
FIG. 21 is an enlarged screen capture of the isolux plot illumination comparator product model search utility of FIGS. 17 and 20, according to a first embodiment.
Figure 22:
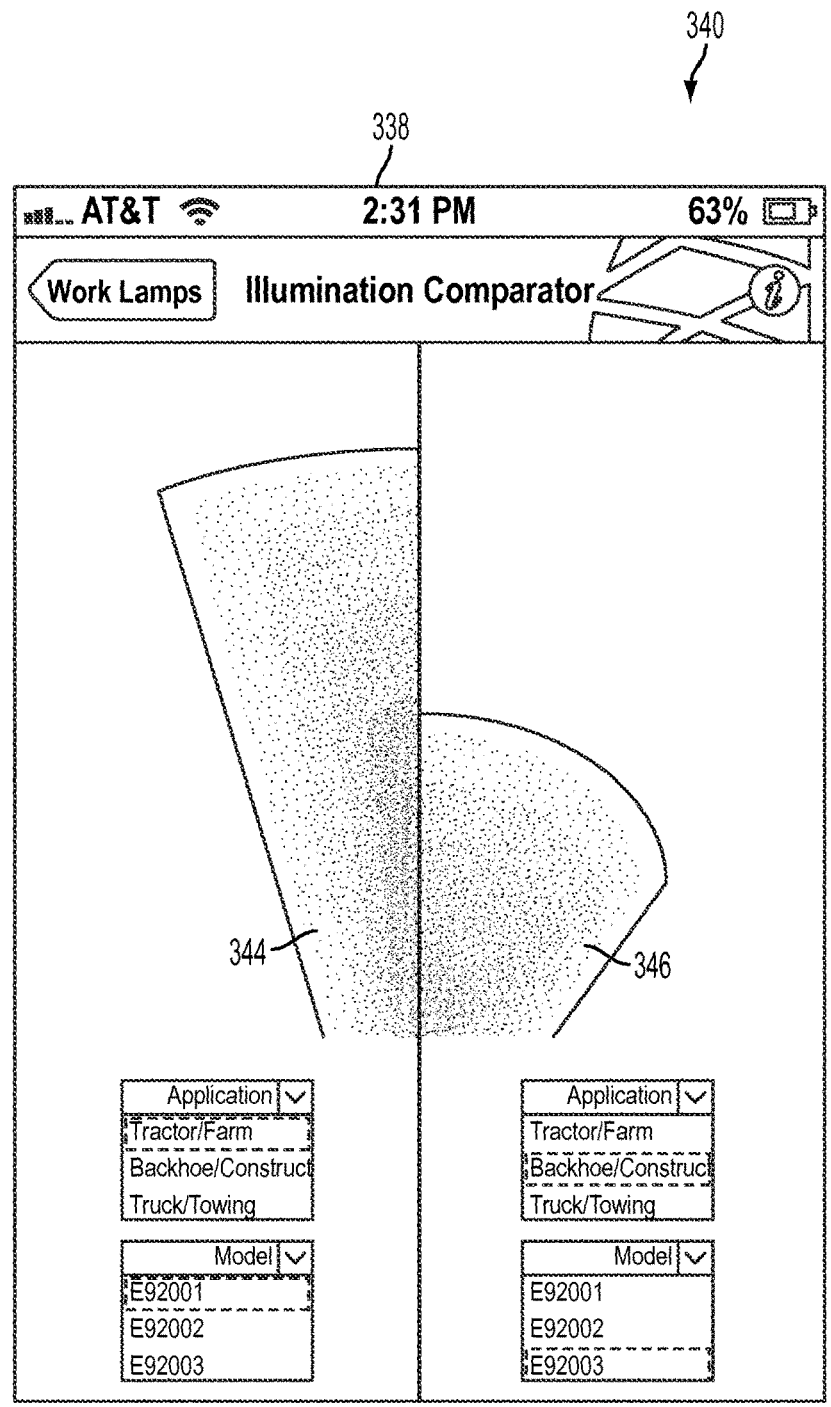
FIG. 22 is an enlarged screen capture of the isolux plot illumination comparator product model search utility of FIGS. 17 and 20, according to a second embodiment.

According to the first embodiment of intensity level measurement product model search utility, as explained in detail with reference to FIGS. 2-16, app 25 has a sound intensity level measurement product model search utility that samples with microphone 20 sound 16 and any additional ambient noise for identifying a suitable vehicle safety warning alarm product model. Likewise, FIGS. 17-19 show the second embodiment of intensity level measurement product model search utility, which is a lux level measurement product model search utility using image sensor 21 to identify a suitable vehicle work lamp. Also, FIGS. 20-22 show an isolux plot illumination comparator product model search utility for comparing pre- or user-defined isolux plots (i.e., bird's-eye or top plan overhead views) showing side-by-side vehicle work lamp product model performances.

Figure 2:
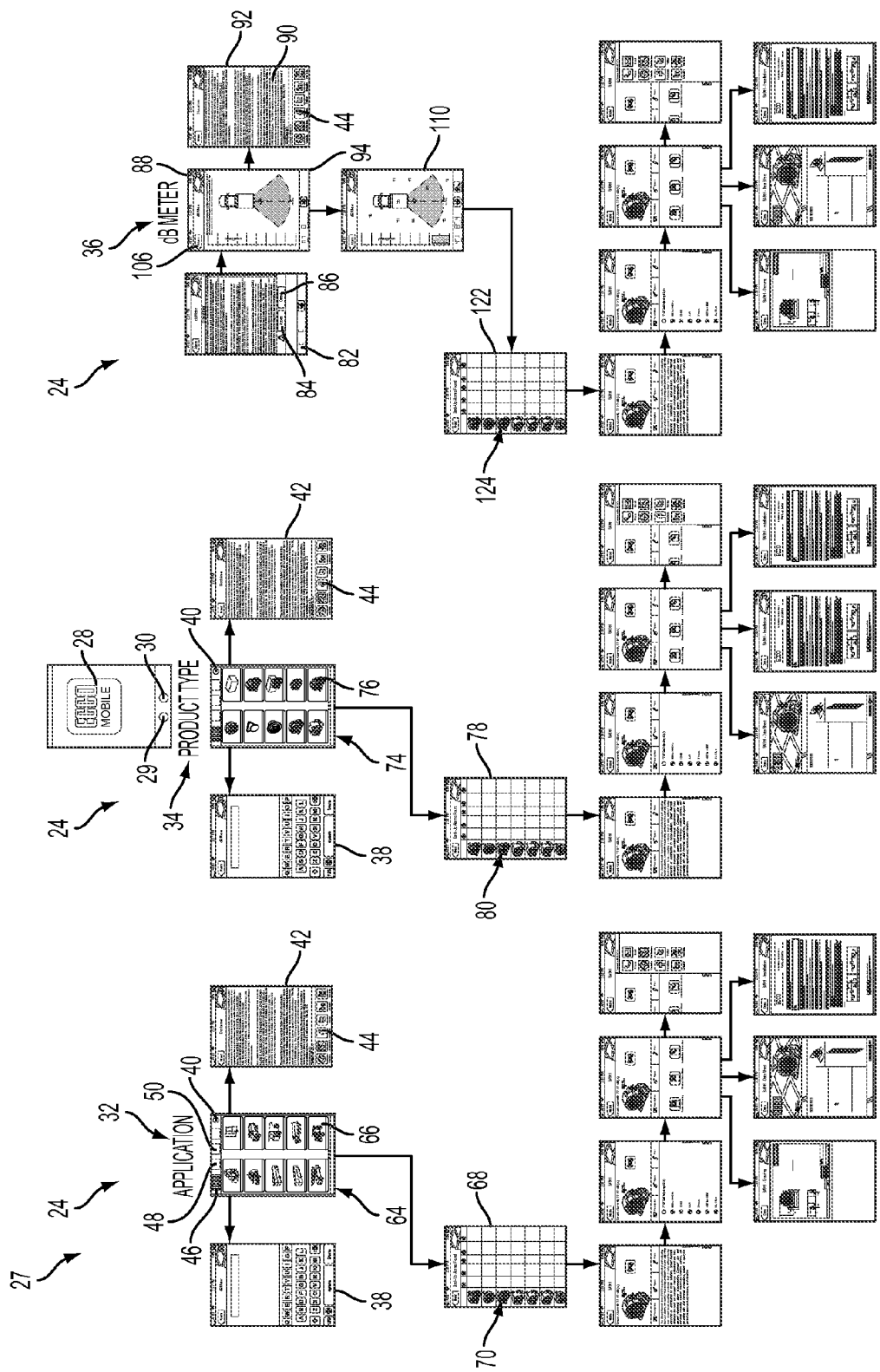
FIG. 2 is a flow diagram of reduced-size screen captures of the interface of FIG. 1, showing hierarchical menu sequences for three vehicle safety alarm product-catalog search utilities including application-specific, product-type, and operating environment sound intensity level measurement product model search utilities.
Figure 23:
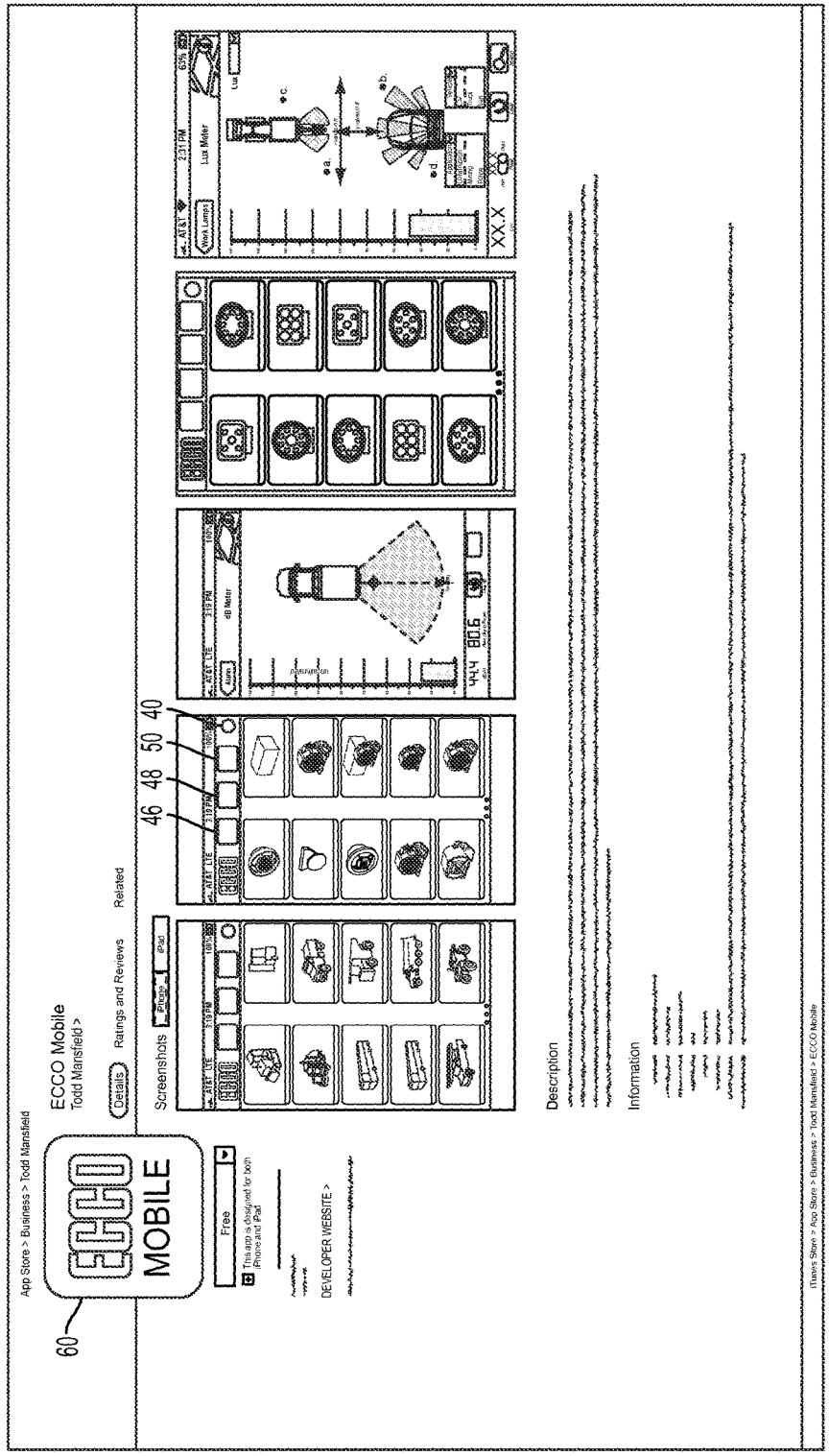
FIGS. 23 and 24 are screen captures of web pages showing the software application of FIGS. 1-22 available for download to a smartphone via, respectively, iTunes® and Google Play® marketplaces.
Figure 24:
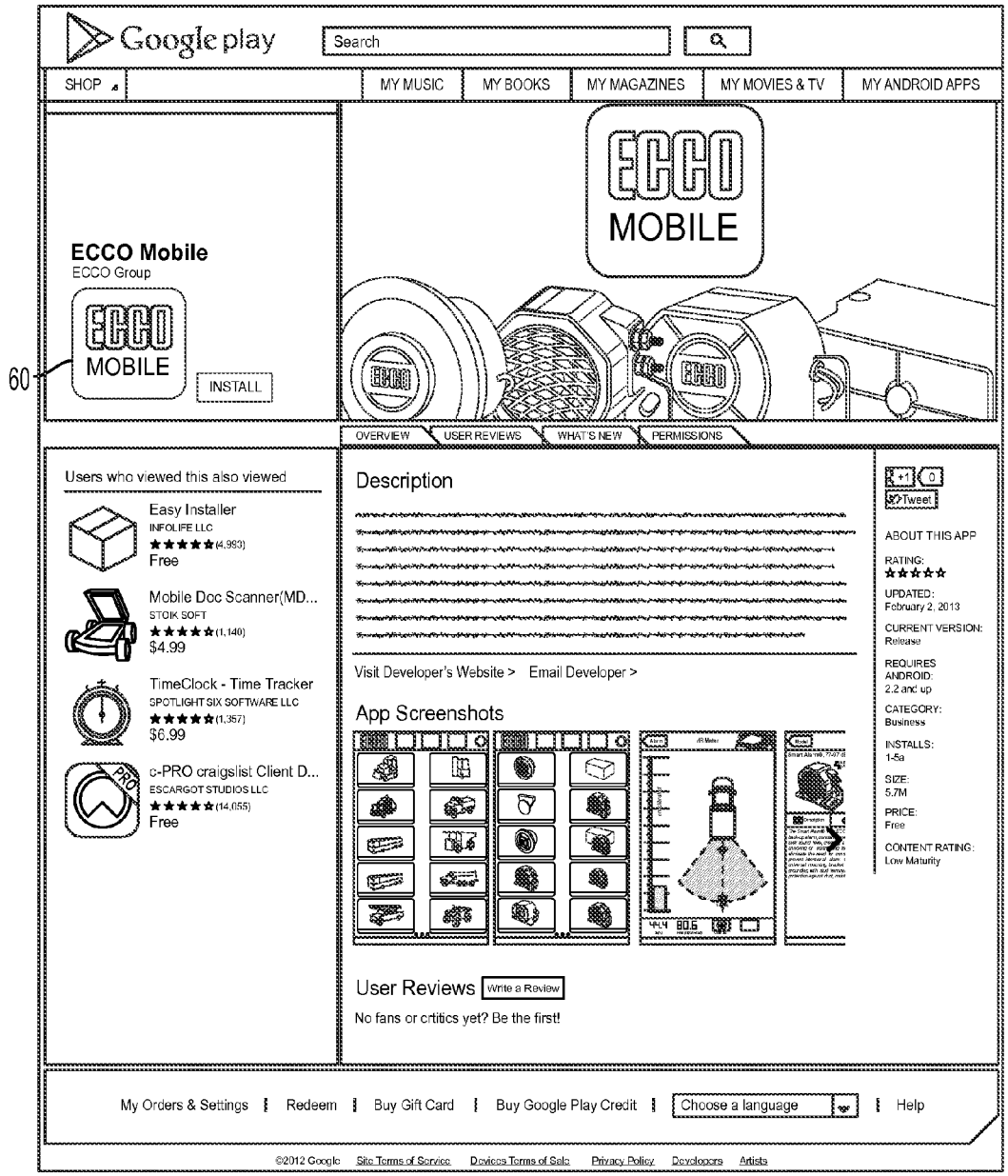

FIG. 2 is a flow diagram 27 of reduced-size screen captures of interface 24, showing hierarchical menu sequences for the selection of vehicle safety warning alarm product models accessible from a database of app 25. After a user launches app 25 by tapping its icon button 60 (enlarged, FIGS. 23-24) from an OS user interface (not shown), interface 24 presents a splash screen 28, at which point a user may select button region 29 to identify vehicle safety warning alarm product models (FIGS. 2-16), or button region 30 to identify vehicle work lamp product models (FIGS. 17-22).

For identifying alarms, interface 24 provides the following three product-catalog search utilities: application-specific, product-type, and operating environment sound intensity level measurement product model search utilities 32, 34, and 36. In response to a user tapping region 29, interface 24 shows application-specific product model search utility 32, which is the default search utility selection presented to user 10. While viewing search utilities 32 and 34, user 10 may swipe touchscreen 22 to reveal a text-based product model search utility 38 that performs searches of a local or remotely stored product catalog based on user keyboard input.

Along the top of search utilities 32 and 34 is a group of four banner icon buttons. A rightmost banner icon button 40 (enlarged, FIG. 23) is selectable to provide marketing information 42 and for connecting via social media links 44 (enlarged, FIG. 6) with the developer of vehicle accessory products described by information accessible in app 25. User 10 uses one of search utilities 32, 34, and 36 by tapping one of three other banner icon buttons 46, 48, and 50 (enlarged, FIG. 23).

Banner icon button 46 switches interface 24 to display application-specific product model search utility 32. Application-specific product model search utility 32 includes a grid 64 of ten buttons, in which each button of grid 64 displays a representative category of vehicle-type image and a label corresponding to a particular operating environment for the type of vehicle. For example, lowermost right button 66 displays a picture of a combine labeled "Agriculture." Other buttons of grid 64 correspond to construction (e.g., backhoes), material handling (e.g., forklift trucks), towing (e.g., tow trucks), waste management (e.g., garbage trucks), commercial transportation (e.g., buses), mining (e.g., dump trucks), municipal transportation (e.g., school buses), road maintenance (e.g., snow plows), and utility and service (e.g., pole-service trucks). Other application categories are also possible. Tapping a button in grid 64 opens a curated list 68 of vehicle safety alarm warning product models 70 predetermined as suitable for the operating environment corresponding to the selected button. Rows of list 68 are selectable to access additional product details, as described with reference to FIGS. 9-16.

Banner button 48 switches interface 24 to display product-type search utility 34. Product-type search utility 34 presents user 10 with a grid 74 of ten buttons, in which each button of grid 74 displays a representative category of product-series type and corresponding series label. For example, lowermost right button 76 displays a picture of a backup alarm representative of a product series labeled "Specialty Alarms." Other buttons of grid 74 correspond to series of forward horns, multi-frequency alarms, and other items categorized according to degree of loudness, durability, installation requirements, or other aspects. Tapping a button in grid 74 opens a curated list 78 of backup alarms 80 including members of the product model series corresponding to the selected button. In a manner similar to list 68, rows of list 78 are selectable to access additional product details.

In some embodiments, vehicle safety alarm warning product models 70 listed in app 25 are vehicle backup beeper products, also known as backup alarms, backup beepers, or vehicle motion alarms. A backup alarm is a device intended to warn passersby of a vehicle moving in reverse. For example, some backup alarms produce 1,000 Hz pure tone beeps at 87-112 decibels (dB).

Figure 3:
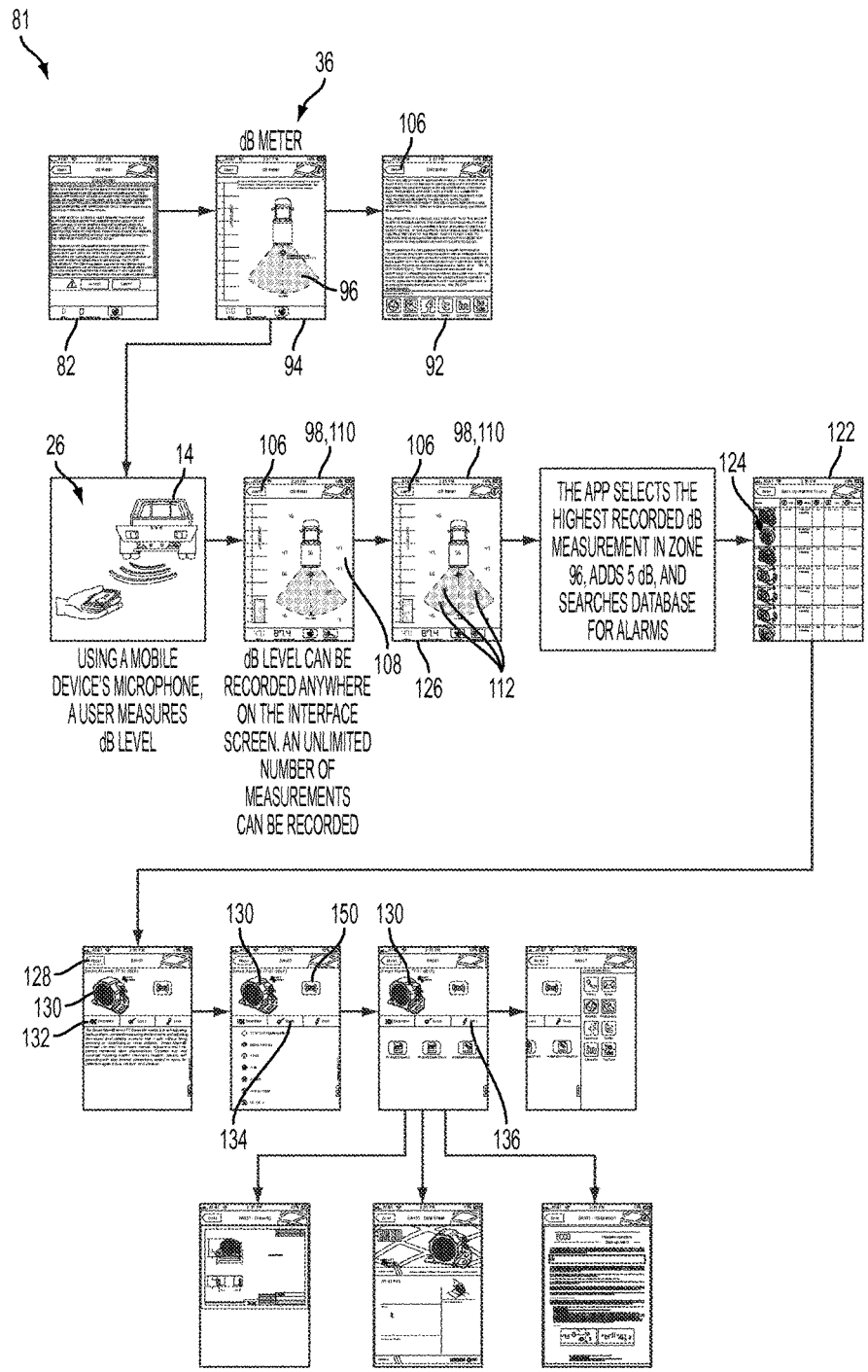
FIG. 3 is an annotated flow diagram showing use of the sound intensity level measurement product model search utility of FIG. 2 in an operating environment of FIG. 1.
Figure 4:
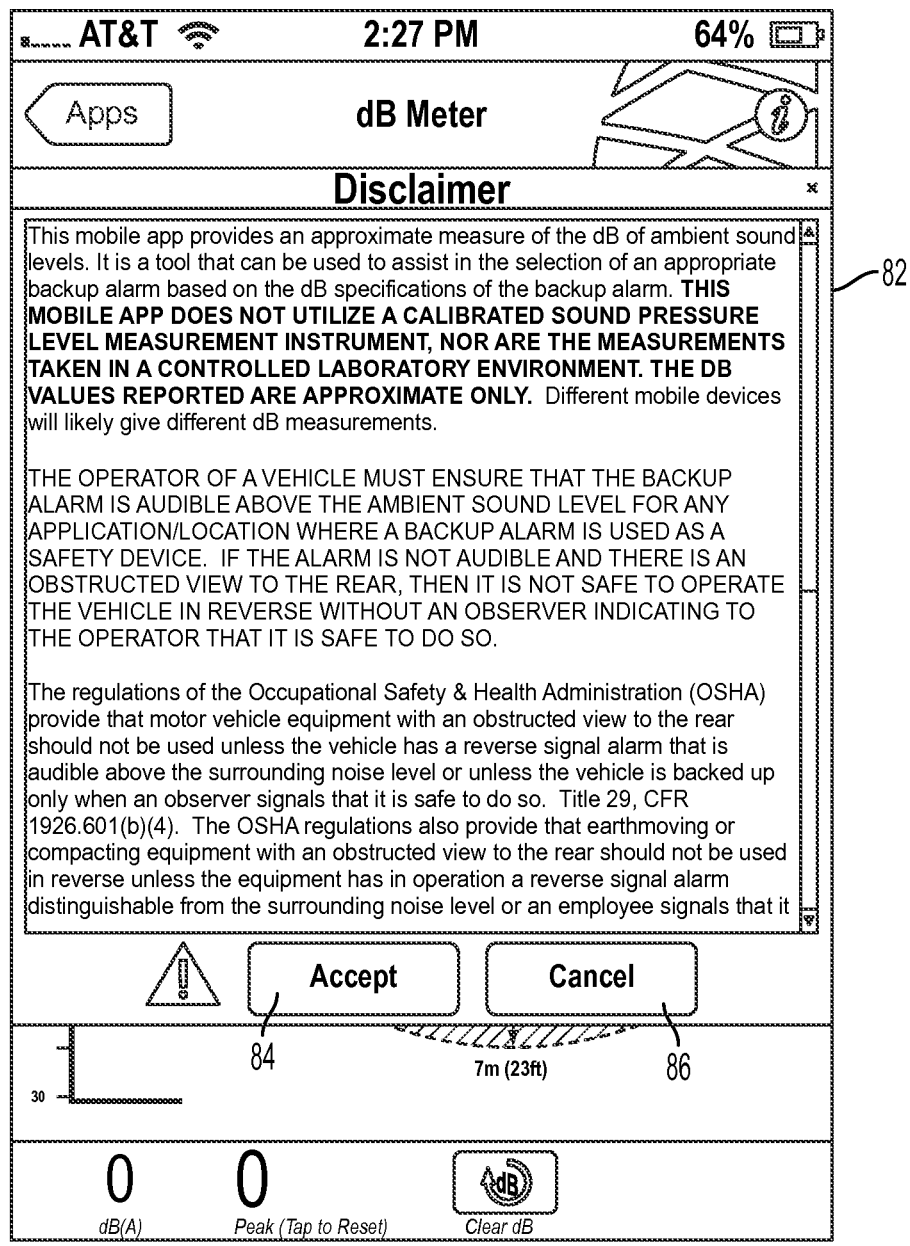
FIGS. 4-16 are enlarged screen captures of the sound intensity level measurement product model search utility of FIGS. 2 and 3.
Figure 5:
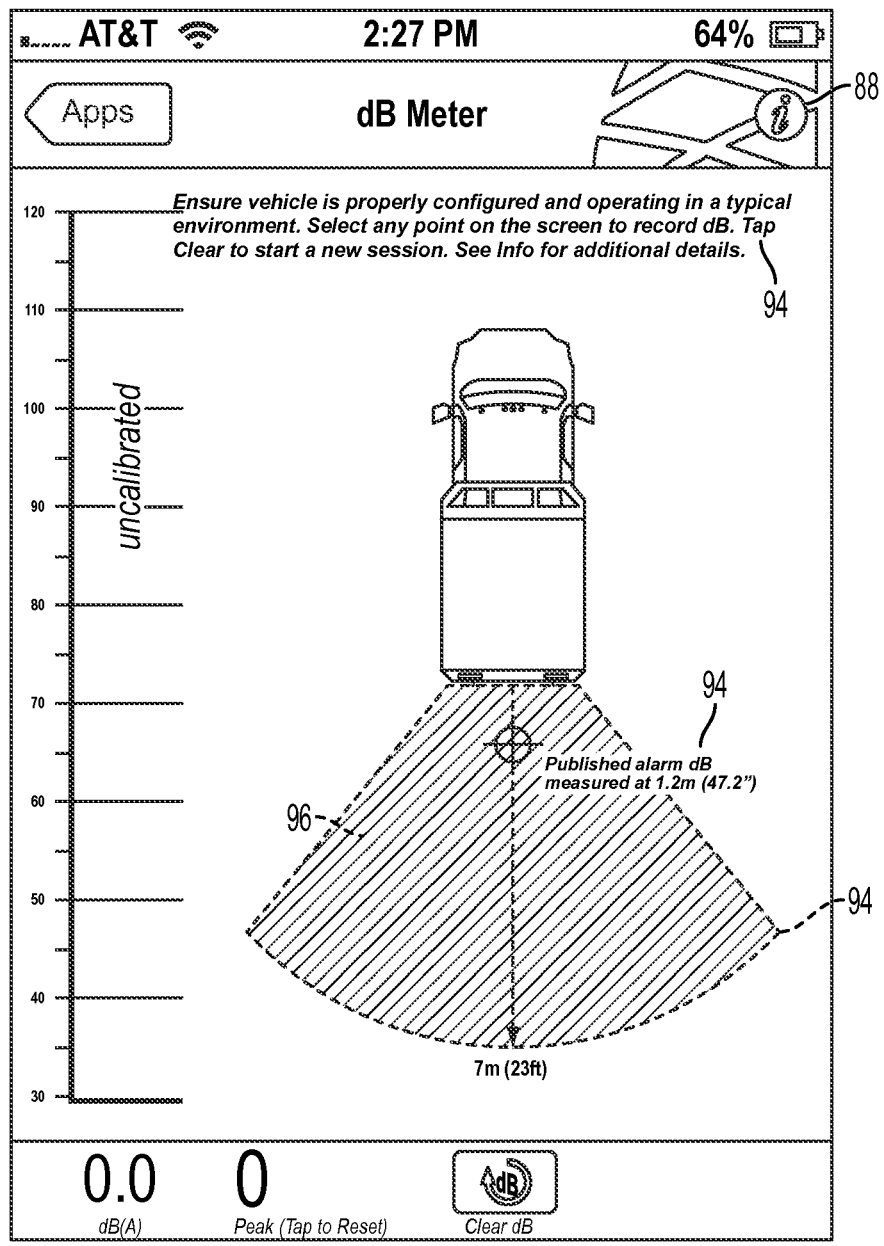
Figure 6:
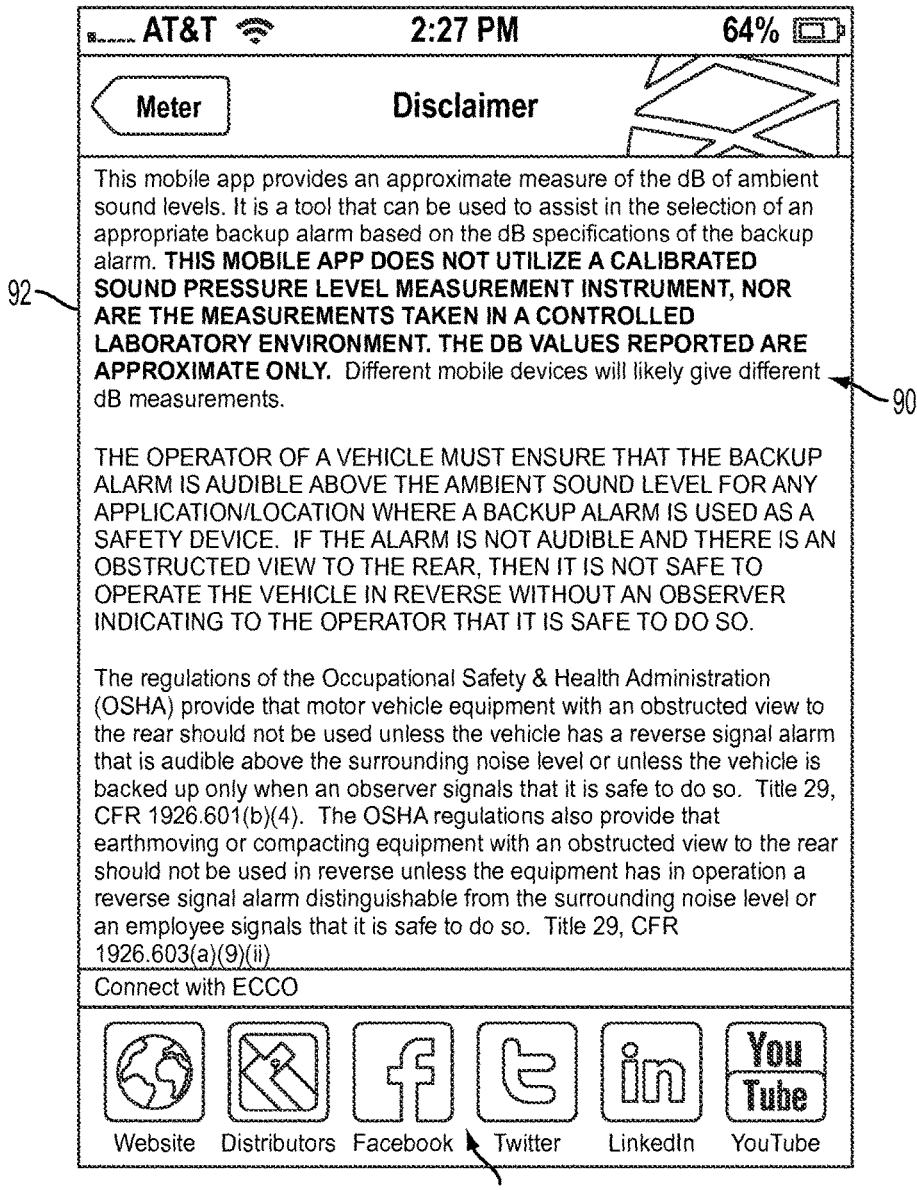
Figure 7:
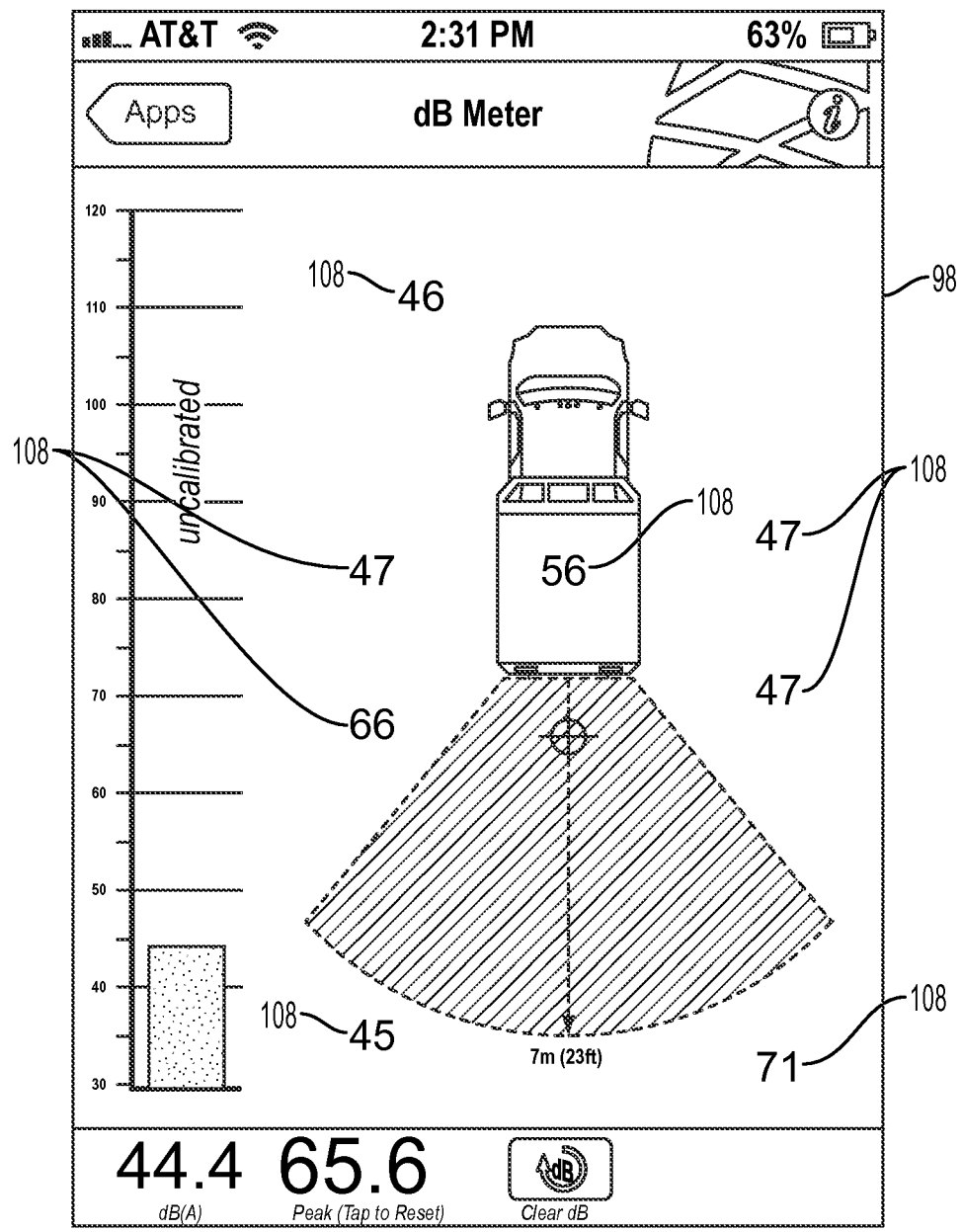

In the United States, the Occupational Safety and Health Administration (OSHA) mandates installation of backup alarms for many types of construction equipment. In some cases, OSHA has required engineering or manufacturer preapproval before permitting an equipment owner or operator to change its alarm. Although backup alarms are typically loud, some alarms selected for an operating environment are insufficiently loud because safety control personnel previously had few convenient tools to determine the on-site ambient noise level while equipment was in use. Thus, banner button 50 switches interface 24 to display operating environment sound intensity level measurement product model search utility 36 (also generally referred to as a decibel-measurement search utility), which is being deployed in the flow diagram of FIG. 3. FIG. 3 is an annotated flow diagram 81 of reduced-sized screen captures showing use of decibel-measurement search utility 36 in operating environment 26 described previously with reference to FIG. 1. FIGS. 4-16 are enlarged screen captures corresponding to those of FIG. 3.

Figure 8:
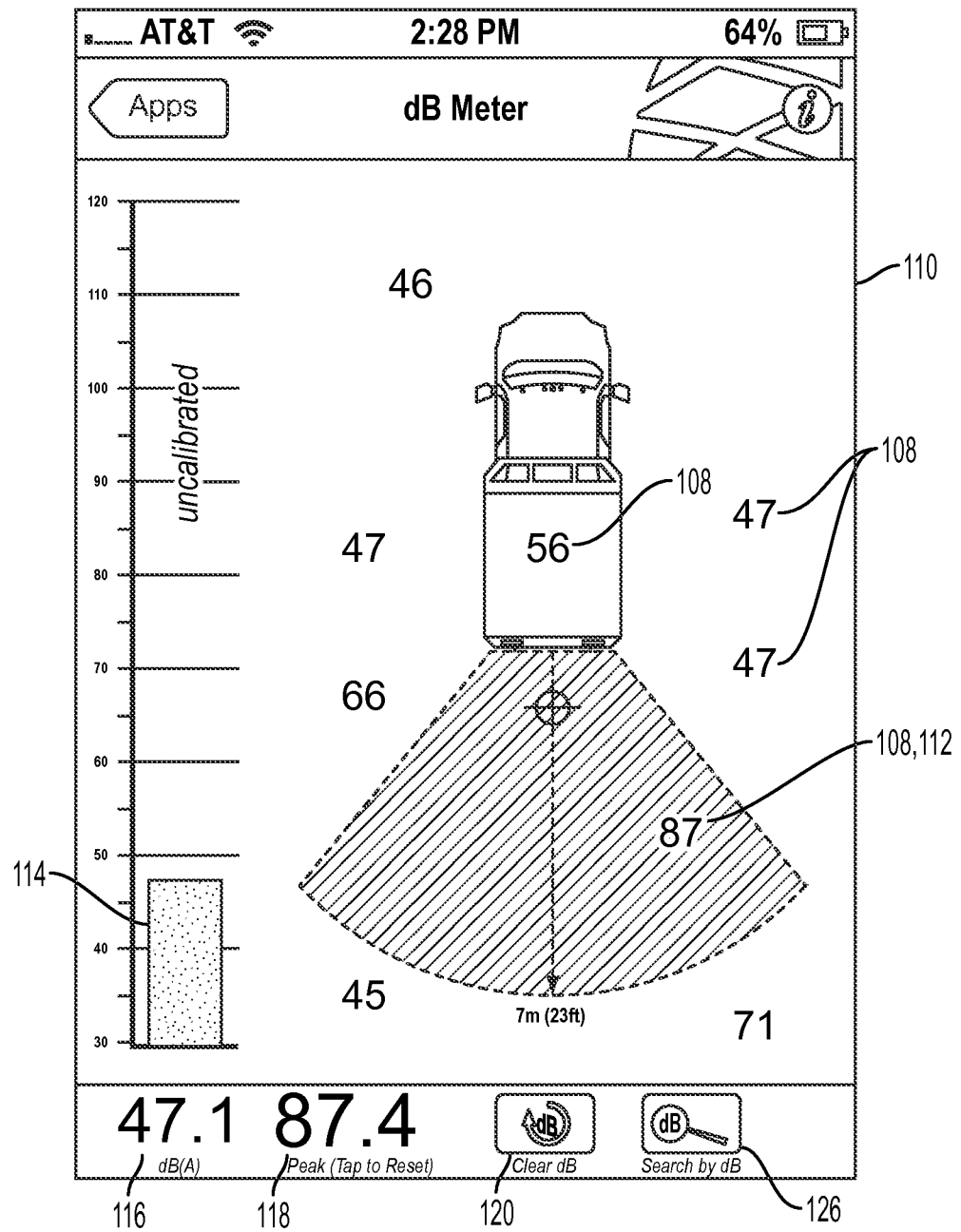

Decibel-measurement search utility 36 presents user 10 with disclaimer information terms 82 (enlarged, FIG. 4), which user 10 may accept (or reject) by tapping accept button 84 (or cancel button 86). Terms 82 are also accessible via banner button 88 (enlarged, FIG. 5), which provides safety information 90 shown in screen capture 92 (enlarged, FIG. 6). After accepting terms 82, dB Meter instruction guide 94 (enlarged, FIG. 5) is displayed for a short period to explain how and where user 10 should obtain sound measurements (e.g., from a region indicated by a yellow measurement zone 96). Guide 94 then fades, leaving behind a dB Meter interface 98 (enlarged, FIG. 7). At any time, user 10 may return to the previously used search utility 32 or 34 by tapping a back button 106, or may begin to collect sound samples 108 as depicted in screen capture 110 (FIG. 3; enlarged, FIG. 8). An unlimited number of measurements can be recorded anywhere around the vehicle by simply tapping on touchscreen 22. Each recorded data point samples sound for two seconds to capture a maximum sound level output registered by microphone 20. For example, user 10 positions microphone 20 behind truck 14 and taps on interface 98 at a screen location corresponding to the physical position of microphone 20. In response to the sampling, app 25 computes a sound-intensity level (e.g., dB measurement) at the location.

Interface 24 shows dB measurement by placing, for each recorded measurement location, red numerals 112 in zone 96 and blue numerals elsewhere. For example, FIG. 3 shows three red numerals 112 for three measurements in zone 96, whereas FIG. 8 shows one 87 dB(A) measurement in zone 96. Additionally, FIG. 8 shows in greater detail a green bar 114 and a dB(A) digital display meter 116 that both continuously provide a free-running sound-level indicator. A second dB(A) digital display meter 118 indicates a peak sound level registered by meter 116. Meter 118 is resettable by tapping in its vicinity. Likewise, sound samples 108 may be deleted from interface 98 by tapping a "Clear dB" button 120.

Once a dB measurement has been captured inside zone 96, app 25 determines one or more backup alarms (or other products) suitable for use in operating environment 26. In one embodiment, app 25 selects the highest recorded dB measurement in zone 96 to obtain a peak sound-intensity level. App 25 compares the peak sound-intensity level to specified sound-intensity levels stored in an alarm-models database, and prepares a list 122 (enlarged, FIG. 9) of backup alarm models 124 having specified sound-intensity levels that meet or exceed the peak sound-intensity level.

An alarm's sound-intensity level is a predetermined value representing a nominal (typical) sound-intensity level. For example, alarm models are designed and tested according to Society of Automotive Engineers (SAE) J994 standards to ensure that corresponding alarm products produce a sound-intensity level within a +/−4 dB(A) tolerance of their specified sound-intensity level. Because alarm products have a +/−4 dB(A) tolerance, app 25 obtains a peak sound-intensity level by adding 5 dB(A) to the highest recorded dB measurement in zone 96, compares the peak sound-intensity level to specified sound-intensity levels, and then prepares list 122. Thus, even when an alarm product featured in list 122 ultimately produces a nominal sound-intensity level that is 4 dB(A) less than its specified value, the alarm will still produce a nominal sound-intensity level that is at least 1 dB(A) greater than the highest recorded dB measurement in zone 96.

Figure 9:
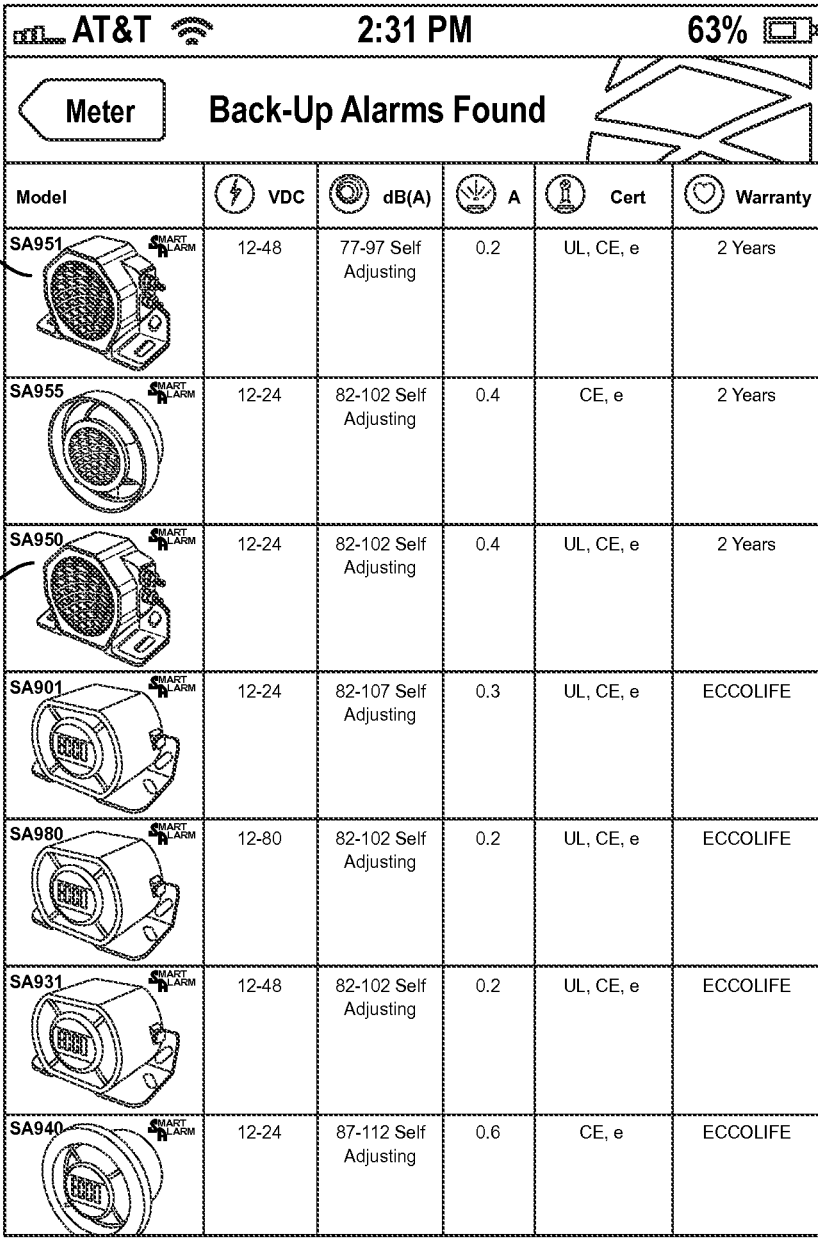
Figure 10:
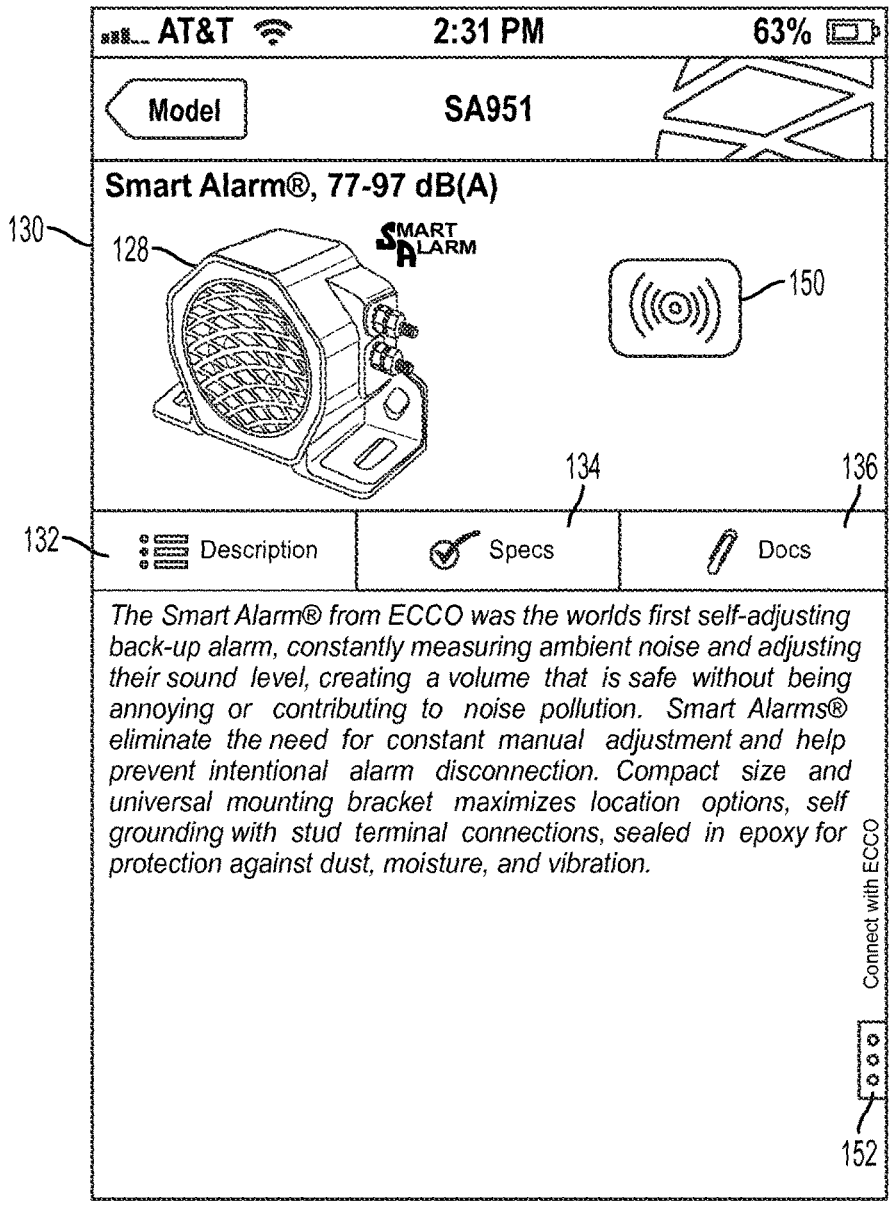
Figure 11:
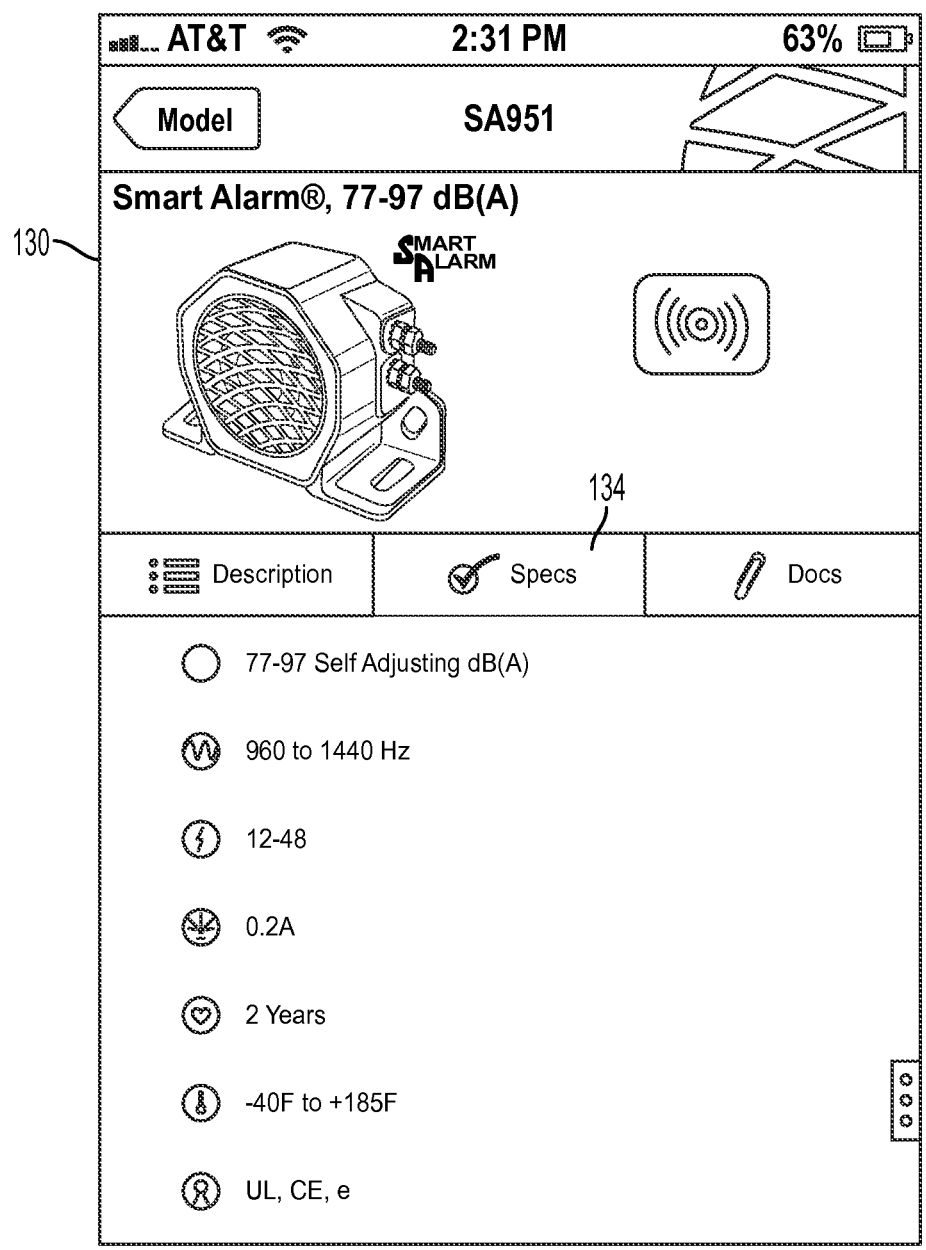
Figure 12:
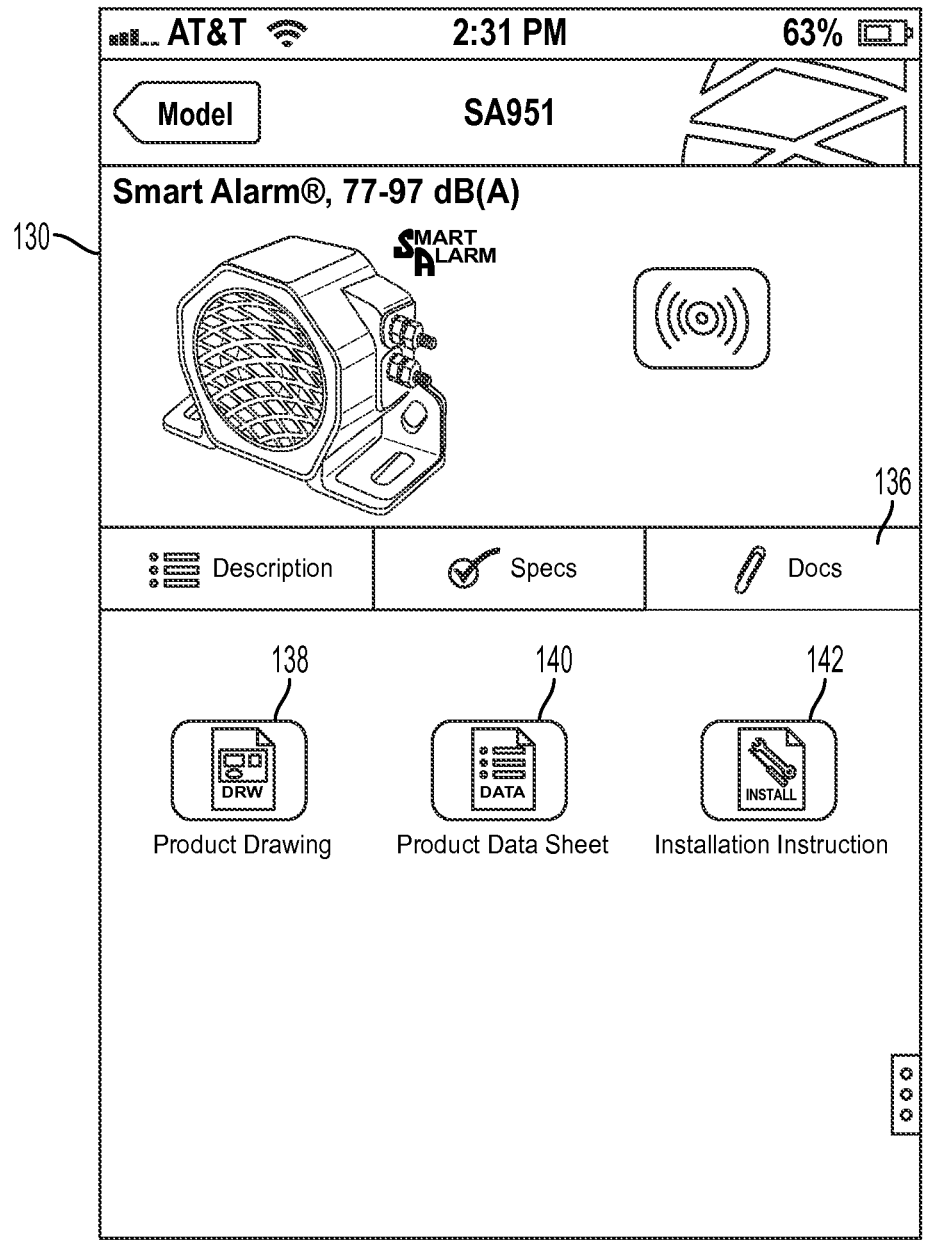
Figure 13:
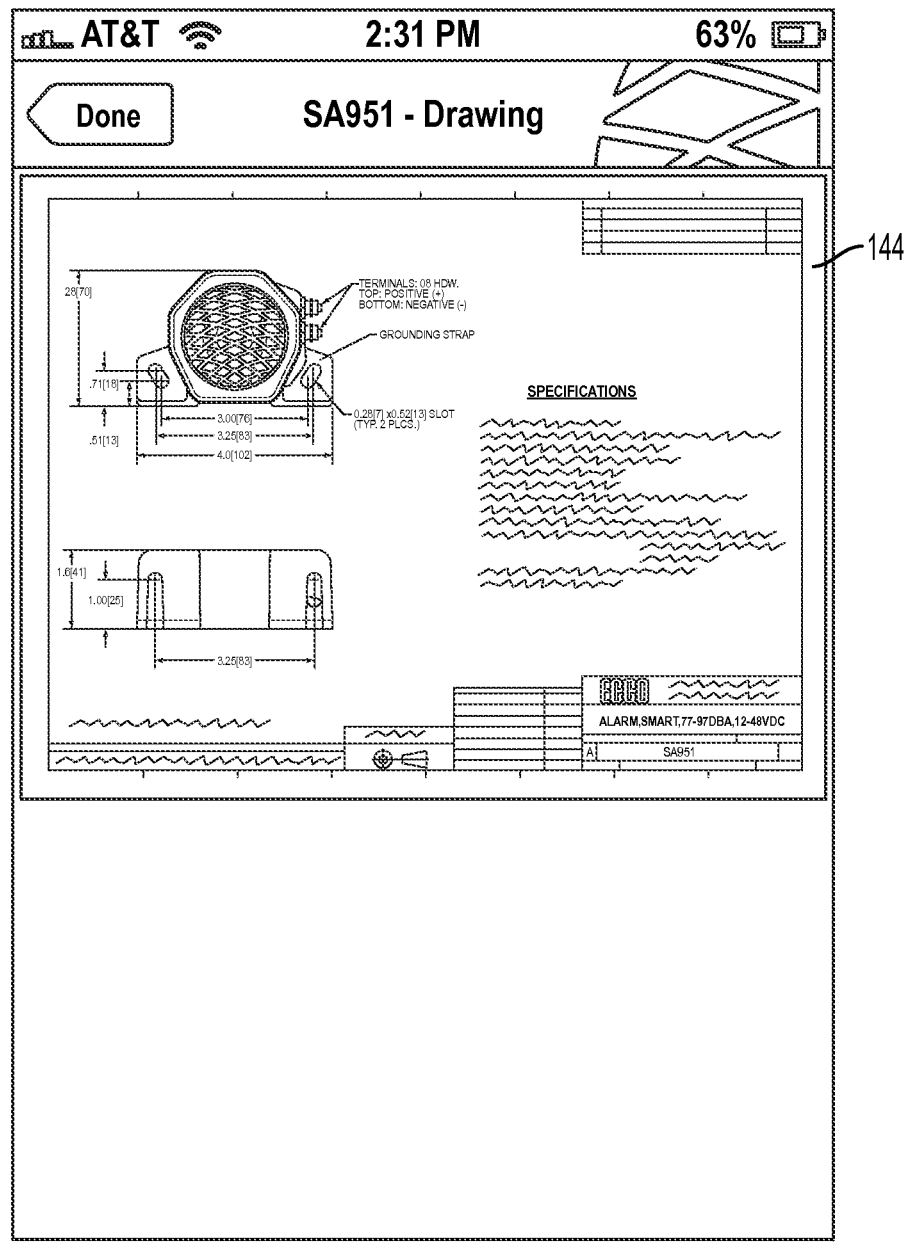
Figure 14:
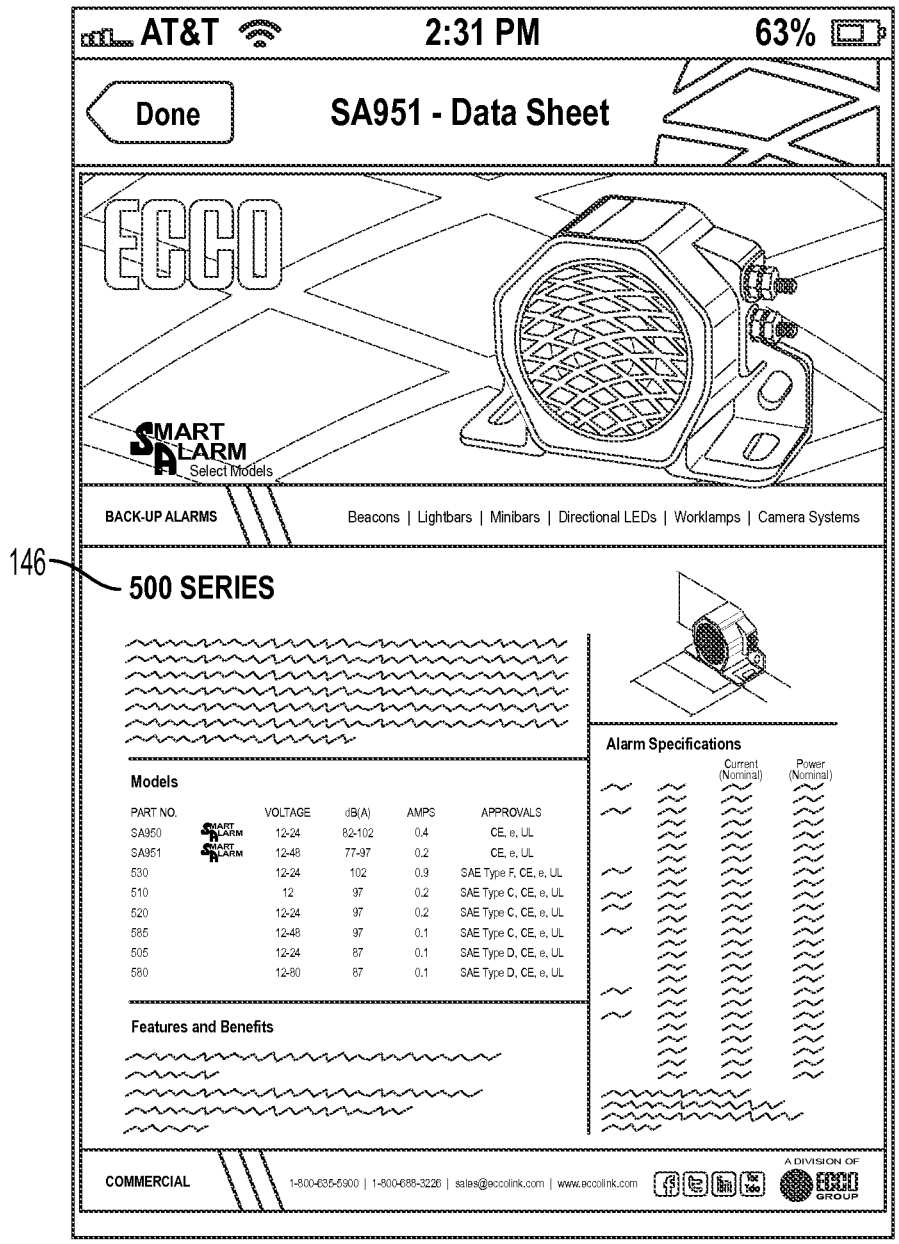
Figure 15:
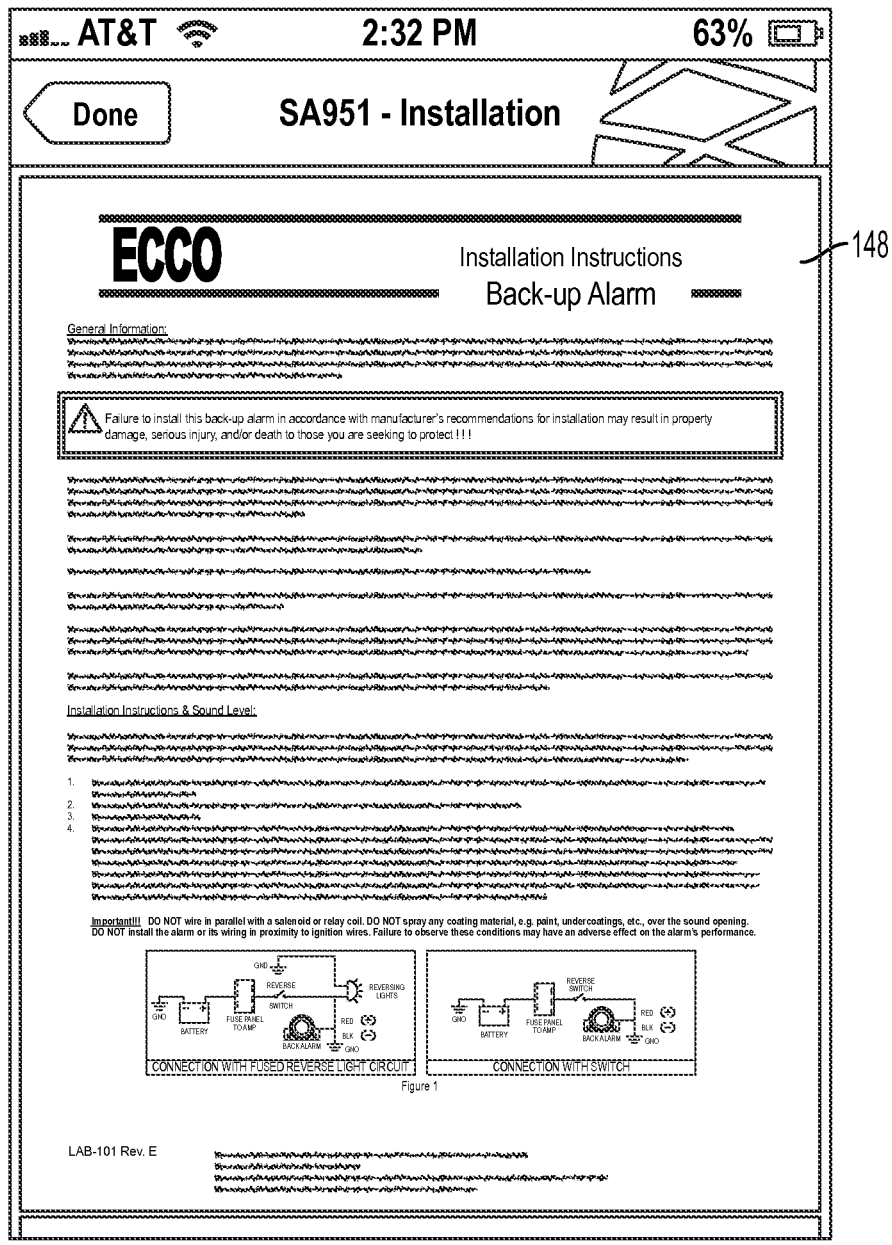
Figure 16:
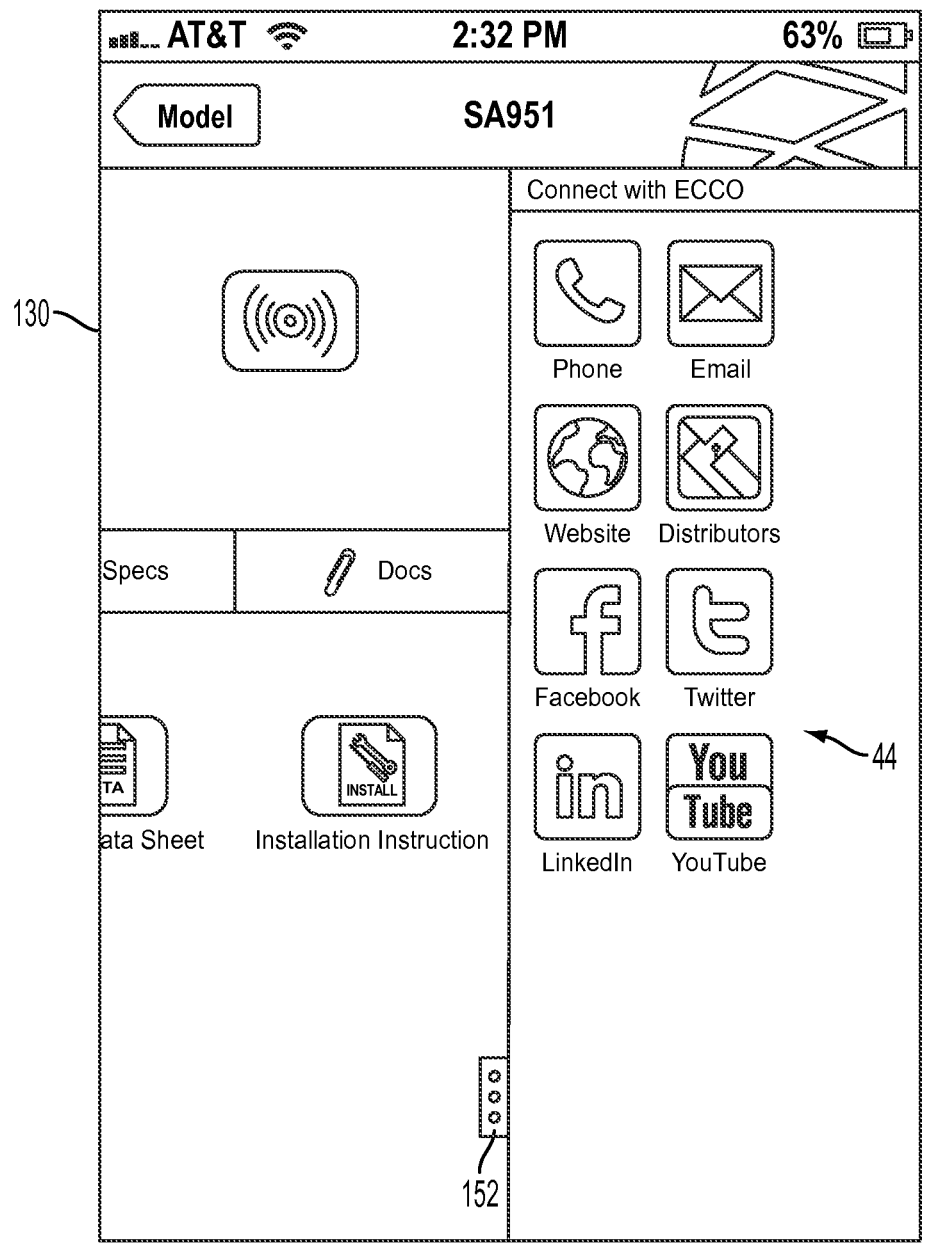

After list 122 is populated, app 25 shows a "Search by dB" button 126 (FIG. 8) that, when tapped, allows user 10 to view the list 122 and learn more about backup alarms 124 that the user 10 may use to satisfy operating environment needs. FIG. 9 shows the list 122 of backup alarms 124 suitable for the user's needs, sorted by increasing SAE standard sound-intensity levels. Tapping a row to select a product 128 opens an alarm model detail screen 130 having three selectable tabs for "Description" 132, which provides a product overview (enlarged, FIG. 10); "Specs" 134, which provides specifications and certifications (enlarged, FIG. 11); and "Docs" 136, which provides product literature buttons 138, 140, and 142 (enlarged, FIG. 12). Buttons 138, 140, and 142 provide access to three types of product literature: mechanical drawings, shown in screen capture 144 (enlarged, FIG. 13); data sheets, shown in screen capture 146 (enlarged, FIG. 14); and installation instructions, shown in screen capture 148 (enlarged, FIG. 15). Also available from screen 130 are a playback button 150 for playing a sample sound bite of product 128 to facilitate product selection and a social media sidebar utility 152, which user 10 can deploy by swiping screen 130 to the left (deployed, FIG. 16).

FIG. 17 is a flow diagram 200 of reduced-size screen captures of interface 24, showing hierarchical menu sequences for the selection of vehicle work lamp product models accessible from a database of app 25. For purposes of this disclosure, vehicle work lamps (or simply work lamps or work lights) are any accessory lighting placed on a vehicle, including, for example, strobe lighting, floodlighting (e.g., floodlights 19, FIG. 1), police take-down lighting, and other lighting.

As noted previously with respect to FIG. 2, after user 10 launches app 25 by tapping its icon button 60 (enlarged, FIGS. 23-24), interface 24 presents a splash screen 28, at which point user 10 may select region 30 to identify work lamps. Aspects of flow diagram 200 that are similar to those of diagram 27 are identified by identical reference numbers that include primes. For example, aspects of application 32', product-type 34' and text-based 38' product model search utilities, marketing information 42', banner buttons 48' and 50', and other related features generally operate as described previously, but relate to work lamp products.

For identifying work lamps, interface 24 provides a lux level measurement product model search utility (or lux-measurement search utility) 202 (analogous to the sound intensity level measurement product model search utility 36), and an isolux plot illumination comparator product model search utility 204.

FIG. 18 is an annotated flow diagram 210 showing use of lux-measurement search utility 202. As noted, this is analogous to decibel-measurement search utility 36, but instead of sensing sound with microphone 20, lux is sensed with image sensor 21.

FIG. 19 is an enlarged screen capture 216 of lux-measurement search utility 202. User 10 may begin the work lamp search process by selecting from dropdown menu 220 an application type, and selecting from dropdown menu 222 a vehicle type. Selection of an application and vehicle type limit the possible product model candidates to those suitable for the selected criteria, but the criteria is optional in some embodiments.

In response to a selection of a vehicle type, app 25 updates a presentation 226 of lux-measurement search utility 202 to show the selected vehicle. For illustrative purposes, screen capture 216 shows two possible vehicle types (a backhoe 230 and a front portion of a police car 234), though in practice only one vehicle is displayed at any time.

In some embodiments, selection of a vehicle type adjusts a scaling factor of presentation 226. For example, backhoe 230 is presented at a relatively smaller scale than that of police car 234. Adjustment of the scaling factor can also be achieved with pinch-to-zoom functionality. The scaling factor determines how a spatial location of a sample (e.g., sample a, b, c, or d) within the interface 24 screen region corresponds to a physical location in operating environment 26. For example, samples a and b are horizontally separated by about two times the width of police car 234 (about 10 feet). Alternatively, these samples are separated by approximately three widths of backhoe 230 (about 30 feet). Coordinates (or distances) for each sample a, b, c, and d are measured from a common origin, which is indicated by a light 240 atop police car 234, a point 242 on backhoe 230, or some other recognizable origin feature.

App 25 compares the relative locations and measured lux values of one or more samples to stored isolux plot data of work lamps suitable for use with the selected application and vehicle type. Suitable work lamps that have isolux plot data meeting or exceeding each of the one or more samples are presented in a list 122' (e.g., FIG. 18) accessible by tapping search button 126'.

Lux-measurement search utility 202 may be used in either of the following two cases: first, to measure lux for an operating environment user 10 wants to duplicate; or second, to improve the lighting in an existing operating environment. In the first case, user 10 would simply ignore a data entry field 256. In the second case, user 10 would input in data entry field 256 a lux value that will be added to each subsequent measurement sample a, b, c, or d. For example, a typical well-lit room has about 500 lux. Assuming operating environment 26 is dim (e.g., samples a, b, c, and d are each 100 lux), user 10 can key 400 lux into data entry field 256 so that samples a, b, c, and d are each recorded as 500 lux. Tapping search button 126' would return a list of lights having minimum lux values exceeding 500 lux (100 measured lux plus 400 additional offset lux), thereby identify products ensuring operating environment 26 is well lit. Additionally, user 10 may slide toggle 260 to show a minimum or a maximum recorded lux measurement value on display meter 118'.

In some embodiments (not shown), app 25 dynamically creates and displays an isolux plot in response to several spaced-apart lux measurement values being recorded. The dynamic isolux plot can be readily compared to available isolux plot data of product models, as discussed in the following paragraphs with reference to FIGS. 20 and 21.

FIG. 20 is an annotated flow diagram 300 showing use of isolux illumination comparator product model search utility 204, and FIG. 21 shows an enlarged screen capture 310 of utility 204. Isolux plots (or isolux charts) represent a single lamp's light beam pattern (width and distance) illuminated on a flat surface. Color shades are used in an isolux plot to represent various illumination intensity levels. Typically, a darker blue shade represents 0.25 lux (i.e., the light intensity level of the full moon under clear atmospheric conditions), a lighter shade color represents a maximum lux value, and a gradient of several intermediate color shades between the darker and lighter shades represent intermediate lux values. Isolux plots can be displayed in a variety of views including isometric, plan, side elevation, or perspective views.

Screen capture 310 has a split screen presentation 314. A left side 318 of presentation 314 shows a first isolux plot 320 corresponding to a work lamp product model selected using left-side dropdown (optional) application-type menu 324 and model number menu 326. A right side 330 of presentation 314 shows a second isolux plot 332 corresponding to a work lamp product model selected using right-side dropdown (optional) application-type menu 334 and model number menu 336. User 10 can readily compare isolux plots, and flow diagram 300 shows that tapping a left- or right-side isolux plot provides additional product information for the product corresponding to the selected isolux plot.

According to some embodiments, one or both of dropdown menus 326 and 336 include an option for creating an isolux plot based on several points selected in left or right side 318, 330. In response to selection of three or more samples, app 25 would construct an isolux plot emanating from an origin feature (not shown) and encompassing the three or more samples. The intensity data of the isolux plot would be dynamically generated by interpolating intensity values between the lux measurement values for each of the samples.

FIG. 22 is an enlarged screen capture 338 of an isolux illumination comparator product search utility 340. Utility 340 is similar to utility 204, but since each one of isolux plots 320 and 332 is symmetric about its vertical axis, a pair of vertically split isolux plots 344 and 346 are presented so that half of each plot is visible. Presenting half of each plot maximizes the available screen space for each visible half of isolux plots 344 and 346.

It will be understood by skilled persons that many changes may be made to the details of the above-described embodiments without departing from the underlying principles of the invention. For example, a smartphone software application may be used to identify various types of product models suitable for different use cases and operating environments based on a sampled human being sensory stimulus intensity level. The scope of the present invention should, therefore, be determined only by the following claims.

The invention claimed is:

1. A method, performed by an internet-enabled mobile device having a sensor and a touchscreen graphical user interface display, of providing a sound- or light-emitting vehicle accessory product model from among a catalog of product models accessible from a vehicle accessory product information software application, the method comprising:
    presenting with the touchscreen graphical user interface display an intensity level measurement utility having a screen region defining a measurement region of an operating environment for vehicle accessory products;
    receiving with the touchscreen graphical user interface display a user input at a spatial location within the screen region, the spatial location corresponding to a user-selected intensity level measurement location within the measurement region of the operating environment;
    in response to receiving the user input, acquiring with the sensor a sample of an on-site ambient intensity level;
    comparing the sample of the on-site ambient intensity level to one or more of multiple specified operating intensity levels that are accessible from among the catalog and correspond to the product models; and
    in response to the comparing indicating that a specified operating intensity level of the multiple specified operating intensity levels meets or exceeds the sample of the on-site ambient intensity level, presenting on the touch screen graphical user interface display a vehicle accessory product model that is associated with the specified operating intensity level and represents a vehicle accessory product capable of producing an output meeting or exceeding the on-site ambient intensity level.

2. The method of claim 1, in which the sound- or light-emitting vehicle accessory product model comprises a vehicle safety warning alarm product model, the output comprises an audible sound, the intensity level measurement utility comprises a sound intensity level measurement utility, and the sensor comprises a microphone.

3. The method of claim 2, in which the internet-enabled mobile device includes a speaker, and in which the vehicle accessory product information software application includes a utility for playing on the speaker a recorded sample of the audible sound.

4. The method of claim 1, in which the sound- or light-emitting vehicle accessory product model comprises a vehicle work lamp product model, the output comprises illumination, the intensity level measurement utility comprises a lux level measurement utility, and the sensor comprises one or more of an image sensor, lux meter, and illumination sensor.

5. The method of claim 4, in which the vehicle accessory product information software application includes a utility for representing on the touchscreen graphical user interface display a simulated version of the illumination.

6. The method of claim 1, in which the screen region depicts a rendering of a hypothetical operating environment.

7. The method of claim 6, in which the rendering shows a top plan view of the hypothetical operating environment.

8. The method of claim 6, in which the rendering shows a depiction of a vehicle.

9. The method of claim 1, in which the vehicle accessory product information software application includes a work lamp product model comparison utility.

10. The method of claim 1, in which the user input comprises a user tapping on the touchscreen graphical user interface display at the spatial location.

11. The method of claim 1, in which the user-selected intensity level measurement location is near a work vehicle emitting sound or light.

12. The method of claim 1, in which the catalog of product models includes information about vehicle reversing alarms.

13. The method of claim 1, in which the catalog of product models is accessible from a database of product model information stored locally on the internet-enabled mobile device.

14. The method of claim 13, in which the product model information includes product dealer information.

15. The method of claim 13, in which the product model information includes product technical specifications.

16. The method of claim 13, in which the product model information includes product installation instructions.

17. The method of claim 1, in which the vehicle accessory product information software application includes a utility for presenting information about vehicle accessory products based on a category of industrial intended use.

18. The method of claim 1, in which the vehicle accessory product information software application includes a utility for presenting information about vehicle accessory products based on a category of product-series type.

19. The method of claim 1, in which the specified operating intensity level is a specified average operating intensity level measured at a predetermined distance away from each of different ones of vehicle accessory products of the identified product model.

20. The method of claim 1, in which the user input is repeatable at multiple locations to obtain a peak intensity value of the sample.

21. The method of claim 1, in which the identified product model comprises multiple product models having corresponding specified operating intensity levels meeting or exceeding an intensity level of the sample.

22. A method, performed by a user of an internet-enabled mobile device having a sensor and a touchscreen graphical user interface display, of selecting a product model from among a catalog of product models accessible from a product information software application, the method comprising:
providing a first user input initiating execution of the product information software application that presents, via the touchscreen graphical user interface display, an intensity level measurement utility having a screen region corresponding to a measurement region of an operating environment for vehicle accessory products;
selecting a user-selected intensity level measurement location within the measurement region of the operating environment by carrying the internet-enabled mobile device to a desired location within the measurement region so that the sensor is available to sample a human being sensory stimulus intensity level at the desired location;
while the sensor is located at the desired location, providing a second user input on the touchscreen graphical user interface display at a spatial location within the screen region, the spatial location corresponding to the user-selected intensity level measurement location, the second user input causing the intensity level measurement utility to acquire with the sensor a sample of the human being sensory stimulus intensity level to cause the product information software application to compare the sample to one or more of multiple specified operating intensity levels that are accessible from among the catalog and correspond to the product models; and
selecting the product model from among the catalog of product models in response to the product model being presented on the touch screen graphical user interface display based on a comparison of the sample to a specified operating intensity level of the multiple specified operating intensity levels, the specified operating intensity level being associated with the product model so as to represent a vehicle accessory product capable of producing an output meeting or exceeding the sample of the human being sensory stimulus intensity level.

23. The method of claim 22, in which the sensor comprises a microphone, and the human being sensory stimulus intensity level comprises sound intensity level.

24. The method of claim 22, in which the sensor comprises one or more of an image sensor, lux meter, and illumination sensor, and the human being sensory stimulus comprises illumination intensity level.

* * * * *